US010761996B2

(12) United States Patent
Shanbhogue et al.

(10) Patent No.: US 10,761,996 B2
(45) Date of Patent: Sep. 1, 2020

(54) APPARATUS AND METHOD FOR SECURE MEMORY ACCESS USING TRUST DOMAINS

(71) Applicant: Intel Corporation, Santa Clara, CA (US)

(72) Inventors: Vedvyas Shanbhogue, Austin, TX (US); Ravi Sahita, Portland, OR (US); Rajesh Sankaran, Portland, OR (US); Siddhartha Chhabra, Portland, OR (US); Abhishek Basak, Hillsboro, OR (US); Krystof Zmudzinski, Forest Grove, OR (US); Rupin Vakharwala, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 16/147,191

(22) Filed: Sep. 28, 2018

(65) Prior Publication Data

US 2019/0042463 A1    Feb. 7, 2019

(51) Int. Cl.
| | |
|---|---|
| G06F 12/00 | (2006.01) |
| G06F 12/1009 | (2016.01) |
| G06F 12/14 | (2006.01) |
| G06F 9/30 | (2018.01) |
| G06F 9/455 | (2018.01) |
| G06F 21/57 | (2013.01) |
| G06F 21/53 | (2013.01) |

(52) U.S. Cl.
CPC ...... G06F 12/1009 (2013.01); G06F 9/30145 (2013.01); G06F 9/45558 (2013.01);
(Continued)

(58) Field of Classification Search
CPC .. G06F 12/1009; G06F 21/53; G06F 12/1408; G06F 12/145; G06F 9/30145;
(Continued)

(56) References Cited

U.S. PATENT DOCUMENTS

| | | | |
|---|---|---|---|
| 2009/0113110 A1* | 4/2009 | Chen | G06F 9/45558 711/6 |
| 2011/0231630 A1* | 9/2011 | Dannowski | G06F 12/1036 711/207 |

(Continued)

FOREIGN PATENT DOCUMENTS

| | | |
|---|---|---|
| CN | 110659521 A | 1/2020 |
| DE | 102019110309 A1 | 1/2020 |
| EP | 3367287 A1 | 8/2018 |

OTHER PUBLICATIONS

European Search Report and Search Opinion, EP App. No. 19196594.6, dated Feb. 13, 2020, 8 pages.

(Continued)

Primary Examiner — Mardochee Chery
(74) Attorney, Agent, or Firm — Nicholson De Vos Webster & Elliot LLP

(57) ABSTRACT

Examples include an apparatus which accesses secure pages in a trust domain using secure lookups in first and second sets of page tables. For example, one embodiment of the processor comprises: a decoder to decode a plurality of instructions including instructions related to a trusted domain; execution circuitry to execute a first one or more of the instructions to establish a first trusted domain using a first trusted domain key, the trusted domain key to be used to encrypt memory pages within the first trusted domain; and the execution circuitry to execute a second one or more of the instructions to associate a first process address space identifier (PASID) with the first trusted domain, the first PASID to uniquely identify a first execution context associated with the first trusted domain.

27 Claims, 27 Drawing Sheets

(52) U.S. Cl.
CPC ........ *G06F 12/145* (2013.01); *G06F 12/1408* (2013.01); *G06F 21/53* (2013.01); *G06F 21/57* (2013.01); *G06F 2009/45583* (2013.01); *G06F 2009/45587* (2013.01)

(58) Field of Classification Search
CPC ................. G06F 9/45558; G06F 21/57; G06F 2009/45583; G06F 2009/45587; G06F 9/30076; G06F 9/3004; G06F 2212/1052; G06F 12/109
USPC .................. 711/163, 202, 203, 205, 206, 207
See application file for complete search history.

(56) References Cited

U.S. PATENT DOCUMENTS

| | | | | |
|---|---|---|---|---|
| 2013/0007379 A1* | 1/2013 | Kegel | ................... | G06F 21/78 711/154 |
| 2013/0145051 A1* | 6/2013 | Kegel | ................... | G06F 13/28 710/9 |
| 2015/0100791 A1* | 4/2015 | Chen | ................... | G06F 12/1408 713/189 |
| 2018/0046823 A1 | 2/2018 | Durham et al. | | |
| 2018/0165224 A1* | 6/2018 | Brown | ................... | G06F 21/57 |
| 2019/0042467 A1 | 2/2019 | Sahita et al. | | |
| 2019/0042476 A1 | 2/2019 | Chhabra et al. | | |

OTHER PUBLICATIONS

Intel Corporation, "PCI Express Device Security Enhancements", Version 0.7, Jun. 2018, 44 pages.

Intel Corporation, "PCI Express Device Security Enhancements", Version 0.71, retrieved from the Internet: https://www.intel.com/content/dam/www/public/us/en/documents/reference-guides/pciedevice-security-enhancements.pdf, Sep. 2018, 46 pages.

* cited by examiner

APPARATUS AND METHOD FOR SECURE MEMORY ACCESS USING TRUST DOMAINS

BACKGROUND

Field of the Invention

The embodiments of the invention relate generally to the field of computer processors. More particularly, the embodiments relate to an apparatus and method for secure memory access using trust domains.

Description of the Related Art

In computing, a virtual machine (VM) is an emulation of a computer system. VMs are based on a specific computer architecture and provide the functionality of an underlying physical computer system. Their implementations may involve specialized hardware, software, or a combination. A Virtual Machine Monitor (VMM) (also known as a hypervisor) is a software program that enables the creation, management and governance of VMs and manages the operation of a virtualized environment on top of a physical host machine. A VMM is the primary software behind virtualization environments and implementations. When installed over a host machine, VMM facilitates the creation of VMs, each with separate operating systems (OS) and applications. VMM manages the backend operation of these VMs by allocating the necessary computing, memory, storage and other input/output (I/O) resources. VMM also provides a centralized interface for managing the entire operation, status and availability of VMs that are installed over a single host machine or spread across different and interconnected hosts.

To achieve confidential and/or protected VM execution, the memory and the runtime processor state of the host machine must also be protected. It is not sufficient to maintain the confidentiality (and integrity) of just the memory assigned to a VM. It is also desired to prevent a malicious or exploited VMM from performing page remapping attacks for a memory address space via the use of extended page tables (EPT) to alter the final page mappings a VM uses. No complete solution exists to this problem to date.

BRIEF DESCRIPTION OF THE DRAWINGS

A better understanding of the present invention can be obtained from the following detailed description in conjunction with the following drawings, in which.

DETAILED DESCRIPTION

Figure 1A:
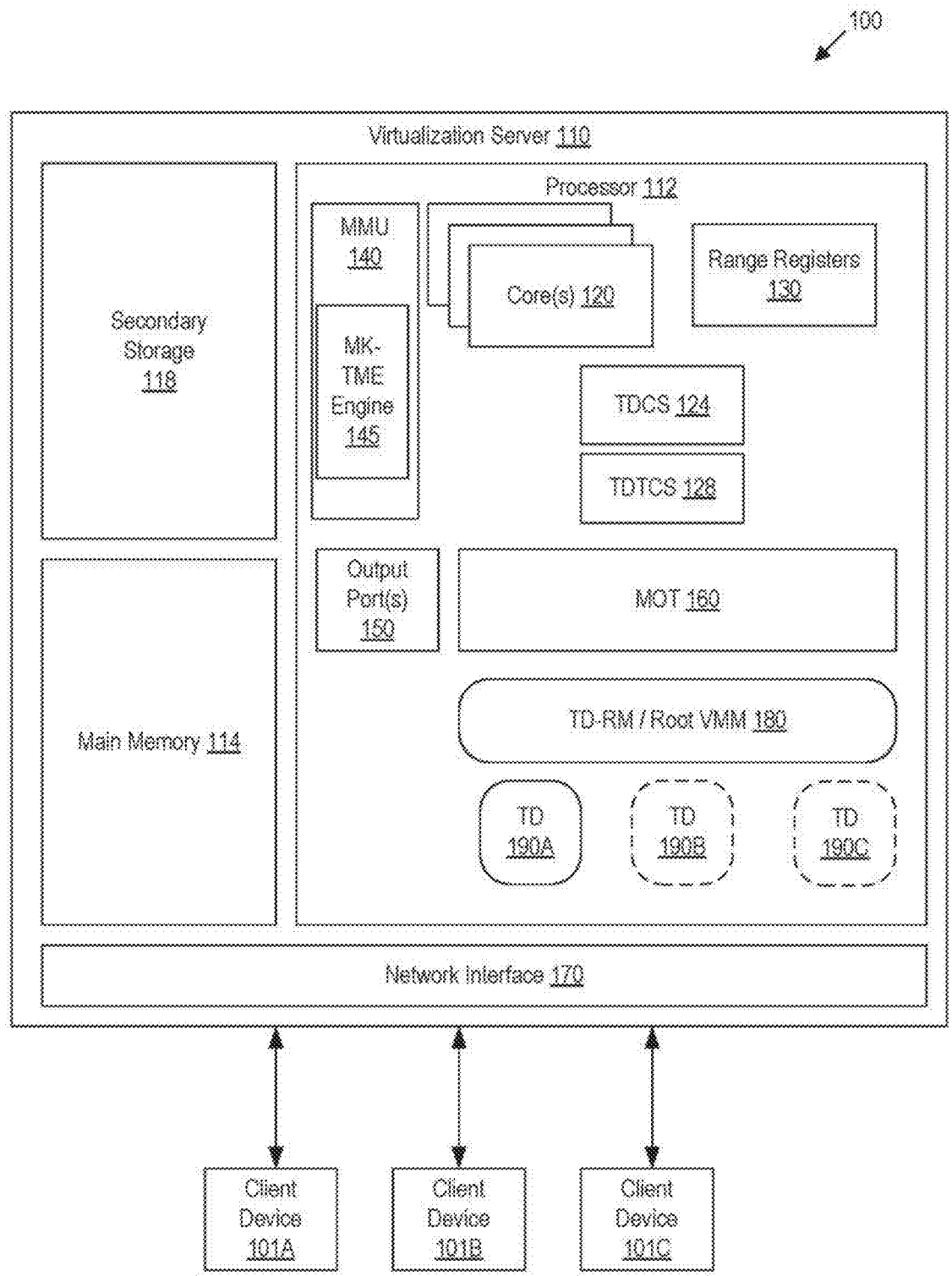
FIG. 1A is a block diagram illustrating an example computing system that provides isolation in virtualized systems using trust domains according to one implementation.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

As contemplated in the present disclosure, embodiments of the present invention include a processor security capability called Trusted Domain Extensions (TDX) to meet increased security objectives via the use of memory encryption and integrity via memory controller engines. As used in TDX, a Trusted Domain (TD) is a protected VM. Embodiments of the present invention deter page remapping attacks from a malicious or exploited VMM on the private memory address space of a TD.

Embodiments comprise an additional extended page table (EPT) structure called a Secure Extended Page Table (SEPT) that is used by a processor for TD private page walks. The SEPT is a per-TD EPT (i.e., each TD has its own SEPT) that is managed by a Trusted Domain Resource Manager (TDRM) only via special instructions newly added to the instruction set architecture (ISA) of the processor. The TDRM cannot alter SEPT without using these instructions otherwise an integrity failure will be reported by the processor. In other embodiments, all or parts of the SEPT may be access-controlled using processor range-register protection.

In typical VM implementations, the processor supports one EPT pointer (EPTP) per virtual memory control structure (VMCS). The VMCS is a data structure in memory that exists once per VM, while the VM is managed by the VMM. With every change of the execution context between different VMs, the VMCS is restored for the current VM, thereby defining the state of the VM's virtual processor. The VMM manages the EPT referenced by the EPTP. In embodiments of the present invention, the VMs may be encapsulated by TDs, and the VMCS may be replaced by an analogous control structure called the Trusted Domain Control Structure (TDCS) that manages the guest state of TDs.

In embodiments of the present invention, at least two new components are used.

Page Miss Handler (PMH): The processor supports a new root pointer called a Trusted Domain (TD) Secure Extended Page Table Pointer (SEPTP) (pointing to the SEPT currently being accessed) and for TD private page accesses performs a nested page walk through the TD OS-managed guest page table (PT) and the SEPT by the page miss handler. For non-private (i.e., shared) memory accesses, the processor performs an ordinary page walk using the untrusted EPT.

Instruction Set Architecture (ISA) to manage SEPT: The processor supports a set of instructions to safely allow the TDRM to manipulate the SEPT without violation of the security objectives-namely that the guest physical address (GPA) to host physical address (HPA) mapping (and GPA attributes) cannot be modified once a page of memory is assigned to a TD. This ISA entails SEPT management using instructions to add a page to a TD, to make a late addition of a page to a TD, to provide memory swapping support for pages assigned to a TD, and to remove a page from a TD. In addition, the processor provides the ISA to explicitly manage SEPT pages.

Addressing EPT remap attacks is one of the core requirements of removing the hypervisor from the Trusted Computing Base (TCB) for TDX to meet cloud service provider requirements. At the same time, the memory management flexibility of the TDRM must be retained for a scalable memory management scheme (e.g., supporting fragmented memory allocation, on-demand assignment, page swapping, etc.,). Embodiments of the present invention meets those non-security requirements as well.

An architecture to provide isolation in virtualized systems using trust domains (TDs) is described. A current trend in computing is the placement of data and enterprise workloads in the cloud by utilizing hosting services provided by cloud service providers (CSPs). As a result of the hosting of the data and enterprise workloads in the cloud, customers (referred to as tenants herein) of the CSPs are requesting better security and isolation solutions for their workloads. In particular, customers are seeking out solutions that enable the operation of CSP-provided software outside of a TCB of the tenant's software. The TCB of a system refers to a set of hardware, firmware, and/or software components that have an ability to influence the trust for the overall operation of the system.

In implementations of the disclosure, a TD architecture and instruction set architecture (ISA) extensions (referred to herein as TD extensions (TDX)) for the TD architecture is provided to provide confidentiality (and integrity) for customer (tenant) software executing in an untrusted CSP infrastructure. The TD architecture, which can be a System-on-Chip (SoC) capability, provides isolation between TD workloads and CSP software, such as a virtual machine manager (VMM) of the CSP. Components of the TD architecture can include 1) memory encryption via a MK-Total Memory Encryption (MKTME) engine, 2) a resource management capability referred to herein as the trust domain resource manager (TDRM) (a TDRM may be a software extension of the Virtual Machine Monitor (VMM)), and 3) execution state and memory isolation capabilities in the processor provided via a CPU-managed Memory Ownership Table (MOT) and via CPU access-controlled TD control structures. The TD architecture provides an ability of the processor to deploy TDs that leverage the MK-TME engine, the MOT, and the access-controlled TD control structures for secure operation of TD workloads.

In one implementation, the tenant's software is executed in an architectural concept known as a TD. A TD (also referred to as a tenant TD) refers to a tenant workload (which can comprise an operating system (OS) alone along with other ring-3 applications running on top of the OS, or a virtual machine (VM) running on top of a VMM along with other ring-3 applications, for example). Each TD operates independently of other TDs in the system and uses logical processor(s), memory, and I/O assigned by the TDRM on the platform. Each TD is cryptographically isolated in memory using at least one exclusive encryption key of the MK-TME engine for encrypting the memory (holding code and/or data) associated with the trust domain.

In implementations of the disclosure, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but is not privy to access the memory state of a TD due to the use of separate encryption keys enforced by the processors per TD, and other integrity and replay controls on memory. Software executing in a TD operates with reduced privileges so that the TDRM can retain control of platform resources. However, the TDRM cannot affect the confidentiality or integrity of the TD state in memory or in the CPU structures under defined circumstances.

Conventional systems for providing isolation in virtualized systems do not extract the CSP software out of the tenant's TCB completely. Furthermore, conventional systems may increase the TCB significantly using separate chipset subsystems that implementations of the disclosure avoid. The TD architecture of implementations of the disclosure provides isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random-access memory (DRAM), or storage class memory (SCM)-based memory, such as Non-Volatile Dual In-line Memory Module (NV-DIMM). As such, implementations of the disclosure allow software to take advantage of performance benefits, such as NVDIMM direct access storage (DAS) mode for SCM, without compromising platform security requirements.

FIG. 1A is a schematic block diagram of a computing system 100 that provides isolation in virtualized systems using TDs, according to an implementation of the disclosure. The virtualization system 100 includes a virtualization server 110 that supports a number of client devices 10IA-101 C. The virtualization server 110 includes at least one processor 112 (also referred to as a processing device) that executes a TDRM 180. The TDRM 180 may include a VMM (may also be referred to as hypervisor) that may instantiate one or more TDs 190A-190C accessible by the client devices 101A-101C via a network interface 170. The client devices 10IA-101 C may include, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

A TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically isolated in memory using a separate exclusive key for encrypting the memory (holding code and data) associated with the TD.

Figure 1B:
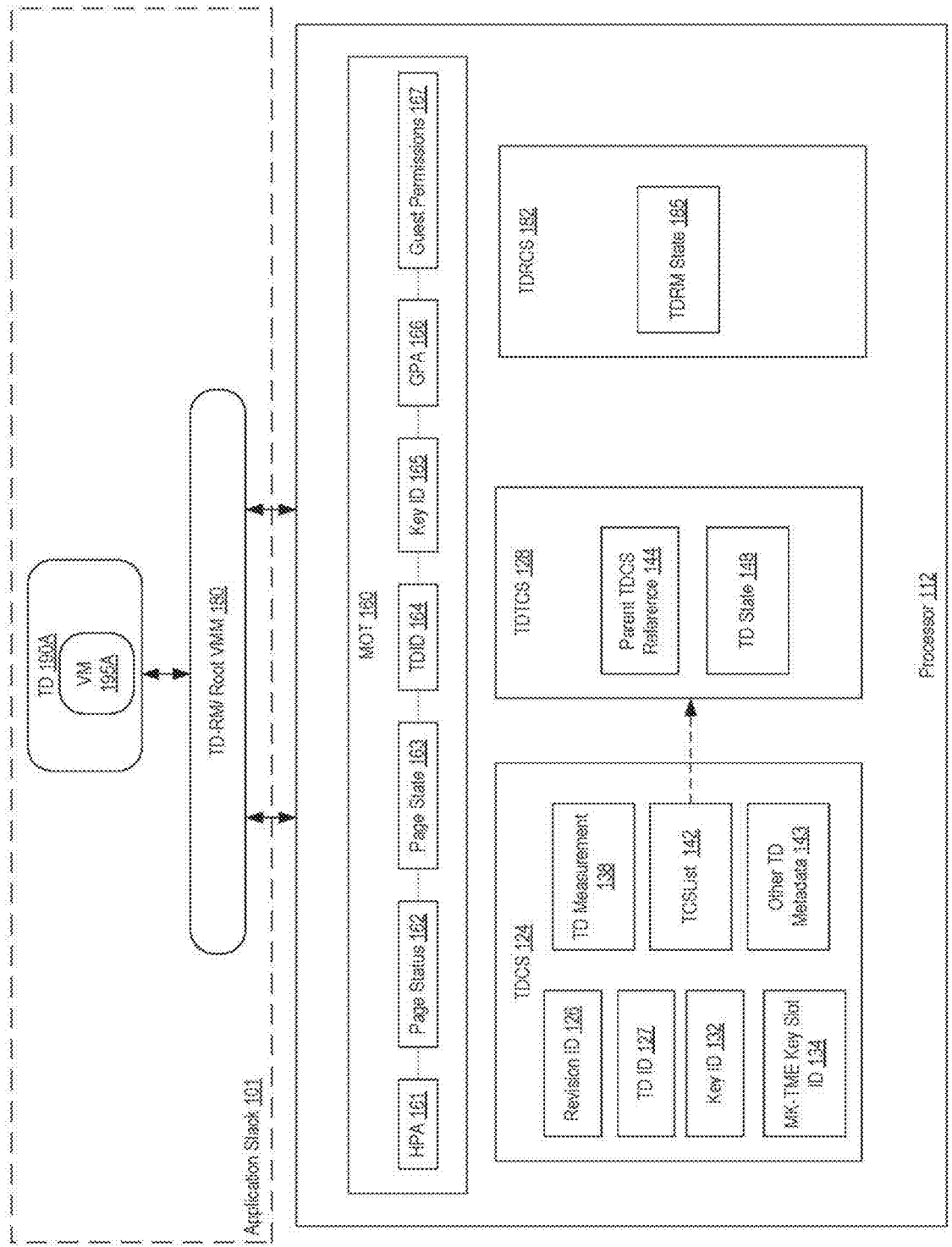
FIG. 1B is a block diagram illustrating another example computing system that provides isolation in virtualized systems using trust domains according to one implementation.

Processor 112 may include one or more cores 120 (also referred to as processing cores 120), range registers 130, a memory management unit (MMU) 140, and output port(s) 150. FIG. 1B is a schematic block diagram of a detailed view of a processor core 120 executing a TDRM 180 in communication with a MOT 160 and one or more trust domain control structure(s) (TDCS(s)) 124 and trust domain thread control structure(s) (TDTCS(s)) 128, as shown in FIG. 1A. TDTCS and TD-TCS may be used interchangeable herein. Processor 112 may be used in a system that includes, but is not limited to, a desktop computer, a tablet computer, a laptop computer, a netbook, a notebook computer, a PDA, a server, a workstation, a cellular telephone, a mobile computing device, a smart phone, an Internet appliance or any other type of computing device. In another implementation, processor 112 may be used in a SoC system.

The computing system 100 is representative of processing systems based on micro-processing devices available from Intel Corporation of Santa Clara, Calif., although other systems (including PCs having other micro-processing devices, engineering workstations, set-top boxes and the like) may also be used. In one implementation, sample system 100 executes a version of the WINDOWS™ operating system available from Microsoft Corporation of Redmond, Wash., although other operating systems (UNIX and Linux for example), embedded software, and/or graphical user interfaces, may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. In an implementation, the computing system 100 includes a component, such as the processor 112 to employ execution units including logic to perform algorithms for processing data.

The virtualization server 110 includes a main memory 114 and a secondary storage 118 to store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by MMU 140.

The core 120 may execute the MMU 140 to load pages from the secondary storage 118 into the main memory 114 (which includes a volatile memory and/or a nonvolatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion of TDRM 180 to translate guest physical addresses to host physical addresses of main memory and provide parameters for a protocol that allows the core 120 to read, walk and interpret these mappings.

In one implementation, processor 112 implements a TD architecture and ISA extensions (TDX) for the TD architecture. The TD architecture provides isolation between TD workloads 190A-190C and from CSP software (e.g., TDRM 180 and/or a CSP VMM (e.g., root VMM 180)) executing on the processor 112). Components of the TD architecture can include 1) memory encryption via MK-TME engine 145, 2) a resource management capability referred to herein as the TDRM 180, and 3) execution state and memory isolation capabilities in the processor 112 provided via a MOT 160 and via access-controlled TD control structures (i.e., TDCS 124 and TDTCS 128). The TDX architecture provides an ability of the processor 112 to deploy TDs 190A-190C that leverage the MK-TME engine 145, the MOT 160, and the access-controlled TD control structures (i.e., TDCS 124 and TDTCS 128) for secure operation of TD workloads 190A-190C.

In implementations of the disclosure, the TDRM 180 acts as a host and has full control of the cores 120 and other platform hardware. A TDRM 180 assigns software in a TD 190A-190C with logical processor(s). The TDRM 180, however, cannot access a TD's 190A-190C execution state on the assigned logical processor(s). Similarly, a TDRM 180 assigns physical memory and I/O resources to the TDs 190A-190C, but is not privy to access the memory state of a TD 190A due to separate encryption keys, and other integrity and replay controls on memory.

With respect to the separate encryption keys, the processor may utilize the MK-TME engine 145 to encrypt (and decrypt) memory used during execution. With total memory encryption (TME), any memory accesses by software executing on the core 120 can be encrypted in memory with an encryption key. MK-TME is an enhancement to TME that allows use of multiple encryption keys (the number of supported keys is implementation dependent). The processor 112 may utilize the MKTME engine 145 to cause different pages to be encrypted using different MK-TME keys. The MK-TME engine 145 may be utilized in the TD architecture described herein to support one or more encryption keys per each TD 190A-190C to help achieve the cryptographic isolation between different CSP customer workloads. For example, when MK-TME engine 145 is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software.

Each TD 190A-190C is a software environment that supports a software stack consisting of VMMs (e.g., using virtual machine extensions (VMX)), OSes, and/or application software (hosted by the OS). Each TD 190A-190C operates independently of other TDs 190A-190C and uses logical processor(s), memory, and I/O assigned by the TDRM 180 on the platform. Software executing in a TD 190A-190C operates with reduced privileges so that the TDRM 180 can retain control of platform resources; however, the TDRM cannot affect the confidentiality or integrity of the TD 190A-190C under defined circumstances. Further details of the TD architecture and TDX are described in more detail below with reference to FIG. 1B.

Implementations of the disclosure are not limited to computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) micro-processing device, a reduced instruction set computing (RISC) micro-processing device, a very long instruction word (VLIW) micro-processing device, a processing device implementing a combination of instruction sets, or any other processing device, such as a digital signal processing device, for example. The processor 112 is coupled to a processing device bus that transmits data signals between the processor 112 and other components in the computing system 100, such as main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an 1/0 controller, etc. These elements perform their conventional functions that are well known to those familiar with the art.

In one implementation, processor 112 includes a Level 1 (L1) internal cache memory. Depending on the architecture, the processor 112 may have a single internal cache or multiple levels of internal caches. Other implementations include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 112, in one implementation, includes a microcode (ucode) ROM to store microcode, which when executed, is to perform algorithms for certain macroinstructions or handle complex scenarios. Here, microcode is potentially updateable to handle logic bugs/fixes for processor 112.

Alternate implementations of an execution unit may also be used in micro controllers, embedded processing devices, graphics devices, DSPs, and other types of logic circuits. System 100 includes a main memory 114 (may also be referred to as memory 114). Main memory 114 includes a DRAM device, a static random-access memory (SRAM) device, flash memory device, or other memory device. Main memory 114 stores instructions and/or data represented by data signals that are to be executed by the processor 112. The processor 112 is coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory 114, and system 1/0, for example. The MCH may be coupled to memory 114 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

With reference to FIG. 1B, this figure depicts a block diagram of the processor 112 of FIG. 1A, according to one implementation of the disclosure. In one implementation, the processor 112 may execute an application stack 101 via a single core 120 or across several cores 120. As discussed above, the processor 112 may provide a TD architecture and TDX to provide confidentiality (and integrity) for customer software running in the customer/tenants (i.e., TDs 190A) in an untrusted cloud service providers (CSP) infrastructure. The TD architecture provides for memory isolation via a MOT 160; CPU state isolation that incorporates CPU key management via TDCS 124 and/or TDTCS 128; and CPU measurement infrastructure for TD 190A software.

In one implementation, TD architecture provides ISA extensions (referred to as TDX) that support confidential operation of OS and OS-managed applications (virtualized and non-virtualized). A platform, such as one including processor 112, with TDX enabled can function as multiple encrypted contexts referred to as TDs. For ease of explanation, a single TD 190A is depicted in FIG. 1B. Each TD 190A can run VMMs, VMs, OSes, and/or applications. For example, TD 190A is depicted as hosting VM 195A.

In one implementation, the TDRM 180 may include as part of VMM functionality (e.g., root VMM). A VMM may refer to software, firmware, or hardware to create, run, and manage a virtual machines (VM), such as VM 195A. It should be noted that the VMM may create, run, and manage one or more VMs. As depicted, the VMM 110 is included as a component of one or more processing cores 120 of a processing device 122. The VMM 110 may create and run the VM 195A and allocate one or more virtual processors (e.g., vCPUs) to the VM 195A. The VM 195A may be referred to as guest 195A herein. The VMM may allow the VM 195A to access hardware of the underlying computing system, such as computing system 100 of FIG. 1A. The VM 195A may execute a guest operating system (OS). The VMM may manage the execution of the guest OS. The guest OS may function to control access of virtual processors of the VM 195A to underlying hardware and software resources of the computing system 100. It should be noted that, when there are numerous VMs 195A operating on the processing device 112, the VMM may manage each of the guest OSes executing on the numerous guests. In some implementations, a VMM may be implemented with the TD 190A to manage the VMs 195A. This VMM may be referred to as a tenant VMM and/or a non-root VMM and is discussed in further detail below.

TDX also provides a programming interface for a TD management layer of the TD architecture referred to as the TDRM 180. A TDRM may be implemented as part of the CSP/root VMM. The TDRM 180 manages the operation of TDs 190A. While a TDRM 180 can assign and manage resources, such as CPU, memory and input/output (I/O) to TDs 190A, the TDRM 180 is designed to operate outside of a TCB of the TDs 190A. The TCB of a system refers to a set of hardware, firmware, and/or software component that have an ability to influence the trust for the overall operation of the system.

In one implementation, the TD architecture is thus a capability to protect software running in a TD 190A. As discussed above, components of the TD architecture may include 1) Memory encryption via a TME engine having Multi-key extensions to TME (e.g., MK-TME engine 145 of FIG. 1A), 2) a software resource management layer (TDRM 180), and 3) execution state and memory isolation capabilities in the TD architecture.

Figure 2A:
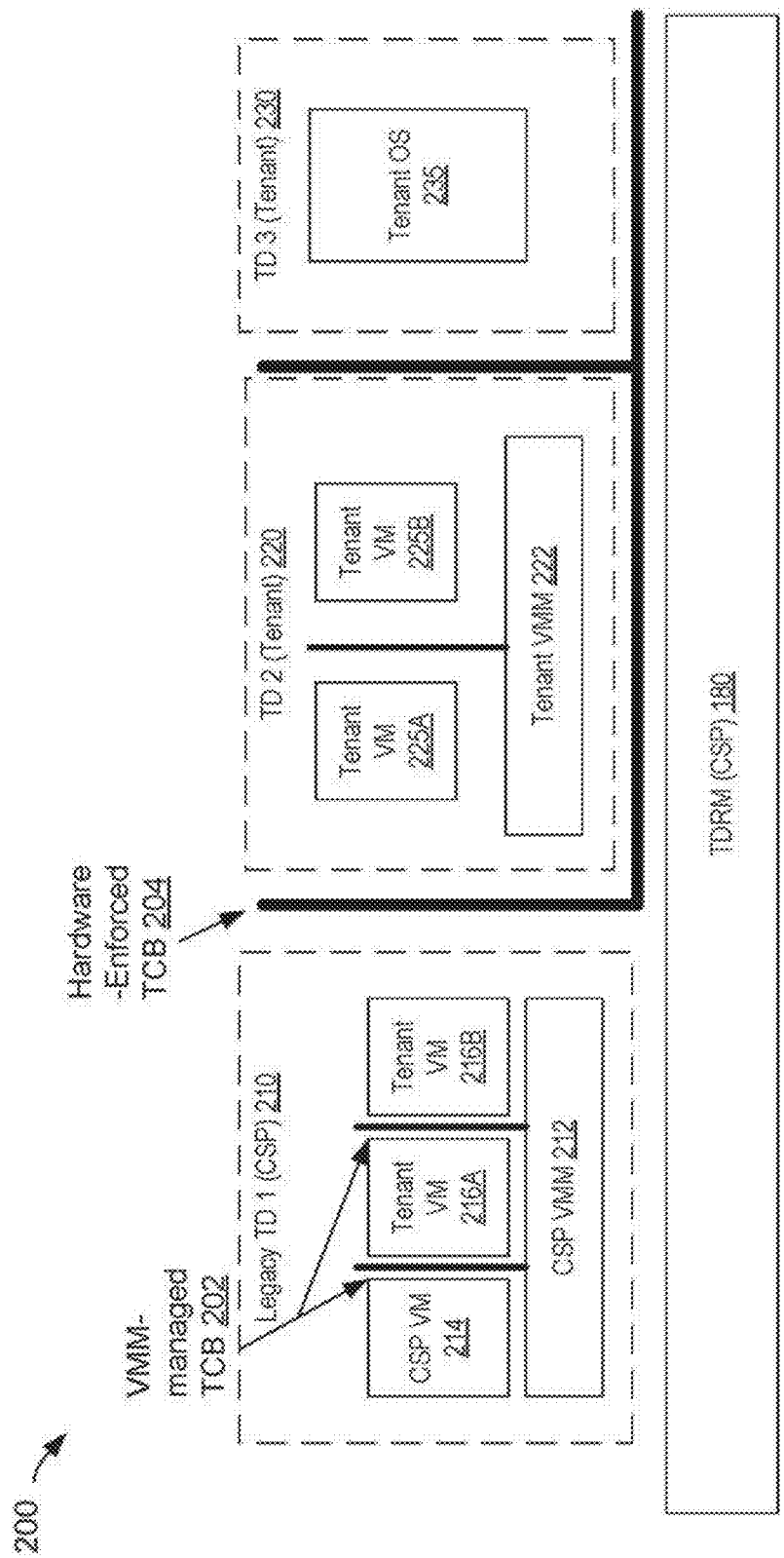
FIG. 2A is a block diagram of an example of a trust domain architecture according to one implementation.

FIG. 2A is a block diagram depicting an example computing system implementing TD architecture 200. The TD architecture 200 supports two types of TDs. A first type of TD is a TD where the tenant trusts the CSP to enforce confidentiality and does not implement the TD architecture of implementations of the disclosure. This type of legacy TD is depicted as TD I 210. TD I 210 is a CSP TD having a CSP VMM-managed TCB 202. TD I 210 may include a CSP VMM 212 managing a CSP VM 214 and/or one or more tenant VMs 216A, 216B. In this case, the tenant VMs 216A, 216B are managed by the CSP VMM 212 that is in the VM's 216A, 216B TCB 202. In implementations of the disclosure, the tenant VMs 216A, 216B may still leverage memory encryption via TME or MK-TME in this model (described further below).

The other type of TD is a TD is a TD where the tenant does not trust the CSP to enforce confidentiality and thus relies on the CPU with TD architecture of implementations of the disclosure. This type of TD is shown in two variants as TD2 220 and TD3 230. The TD2 220 is shown with a virtualization mode (such as VMX) being utilized by the tenant VMM (non-root) 222 running in TD2 220 to managed tenant VMs 225A, 225B. The TD3 230 does not include software using a virtualization mode, but instead runs an enlightened OS 235 in the TD3 230 directly. TD2 220 and TD3 230 are tenant TDs having a hardware-enforced TCB 204 as described in implementations of the disclosure. In one implementation, TD2 220 or TD3 230 may be the same as TD 190A described with respect to FIGS. 1A and/or 1B.

The TDRM 180 manages the life cycle of all three types of TDs 210, 220, 230, including allocation of resources. However, the TDRM 180 is not in the TCB for TD types TD2 220 and TD3 230. The TD architecture 200 does not place any architectural restrictions on the number or mix of TDs active on a system. However, software and certain hardware limitations in a specific implementation may limit the number of TDs running concurrently on a system due to other constraints.

Figure 2B:
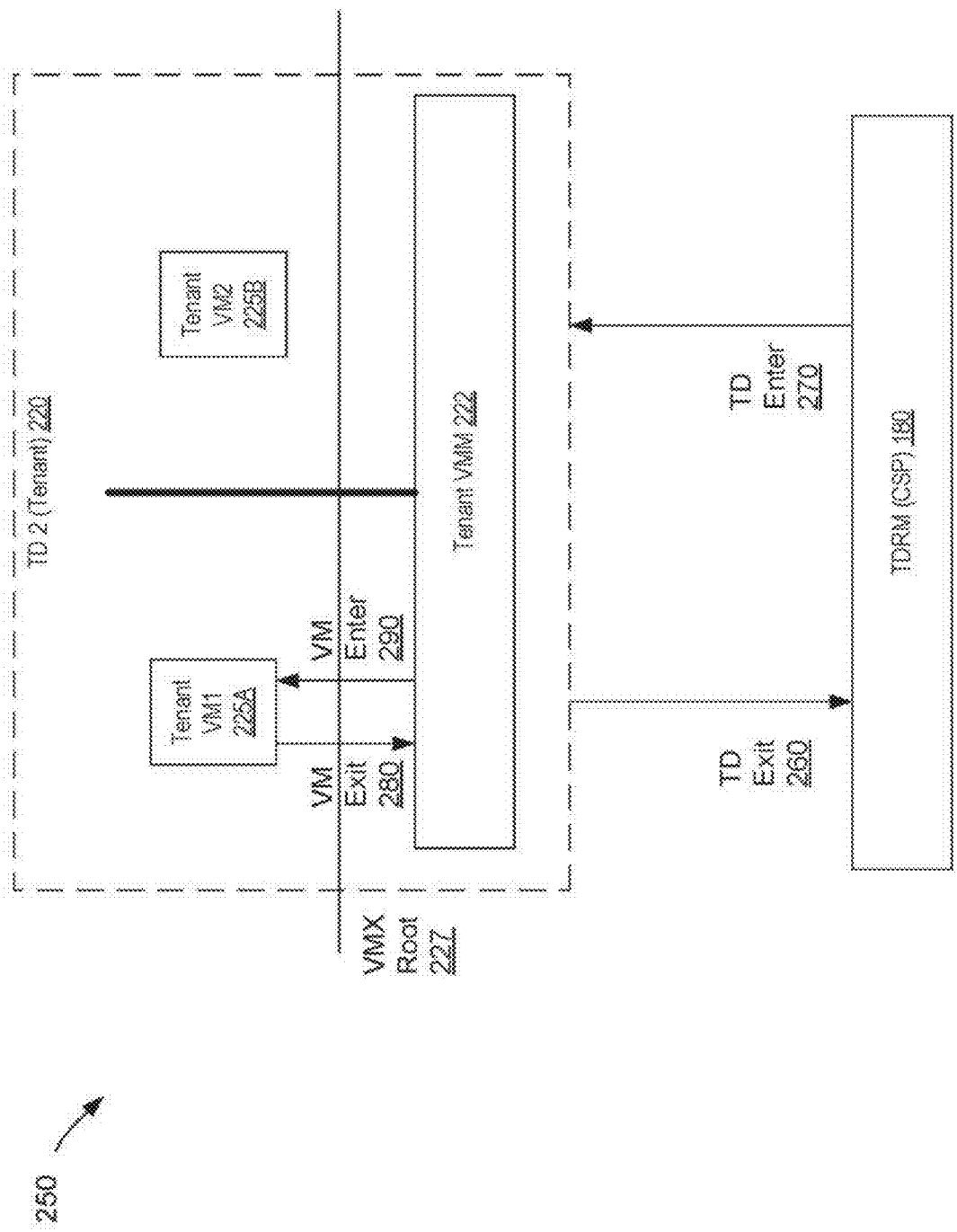
FIG. 2B is a block diagram of another example of a trust domain architecture according to one implementation.

FIG. 2B is a block diagram depicting an example of a TD architecture 250 and the interactions between a TD 220 and TDRM 280. In one implementation, TD 220 and TDRM 280 are the same as their counterparts described with respect to FIG. 2A. The TD architecture 250 may be the same as a TD architecture provided by computing device 100 of FIGS. 1A and 1B, and/or TD architecture 200 of FIG. 2A. TD architecture 250 provides a layer that manages lifecycle of TDs active on a system. Processor support for TDs is provided by a form of processor operation called a TDX operation. There are two kinds of TDX operations: a Resource Manager operation and a Tenant operation. In general, the TDRM 180 runs in TDX Resource Manager operation and TDs, such as TD2 220, run in TDX Tenant operation. Transitions between Resource-Manager operation and Tenant operation are called TDX transitions.

There are two kinds of TDX transitions: TD entry 270 and TD exit 260. Transitions from TDX Resource-Manager operation into TDX Tenant operation are called TD entries 270. Transitions from TDX Tenant operation to TDX Resource Manager operation are called TD exits 260.

Processor behavior in TDX Resource-Manager operation is similar as it is outside of TDX operation. The principal differences are that a set of TDX operations (TDX instructions) is available and that values that can be loaded into certain control registers are limited to restrict the modes and abilities of the TDRM 180.

Processor behavior in TDX Tenant operation is similarly restricted to facilitate isolation. For example, instead of ordinary operation, certain events cause TD exits 260 to the TDRM 180. These TD exits 260 do not allow the TDRM 180 to modify TD 220 behavior or state. The TDRM 180 uses platform capabilities to retain control of platform resources. Software running in a TD 220 may use software-visible information to determine it is running in a TD 220, and may enforce local measurement policies on additional software loaded into the TD 220. However, validating the security state of the TD 220 is performed by a remote attestation party to ensure confidentiality.

The TD architecture 250 is designed to minimize compatibility impact on software that relies on virtualization when running in a TD 220, and therefore, leaves most interactions between a VM 225A, 225B running in Tenant operation and a Tenant VMM 222 running in Tenant operation unchanged. If there is no VMM 222 present in a TD 220, a VM OS may be modified to work with TDRM 180 as the root VMM.

In one implementation, the TDRM 180 may explicitly decide to cause a TD exit 260, for example, to terminate a TD 120 or to manage memory resources (e.g., yield assigned memory resource, request free memory resources, etc.). The TD architecture 250 also provides the TDRM 180 with the ability to force TD exits 260 for preemption. On TD exits 260, the TD architecture enforces that the execution state of a TD 220 is saved in CPU access-controlled memory allocated to the TD 220 and encrypted using a unique encryption key (discussed further below) of the TD 220 that is not visible to TDRM 180 or other TDs to protect confidentiality of TD state from the TDRM 180 or other TDs. The TD execution state may similarly be protected against spoofing, remapping and/or replay via integrity controls on memory.

TD enter 270 is a complementary event to TD exit 260. For example, a TD enter 270 may occur when the TDRM 180 schedules a TD 220 to run on a logical processor and transfers execution to the software running in the TD 220. During TD enter 270, the TD architecture 250 enforces that the execution state of the TDRM 180 is saved in memory owned by the TDRM, which is encrypted using a unique encryption key assigned for sole use by the TDRM 180.

TDs, such as TD 220, can be set up by the TDRM 180 using a TDCREATE (to create TDCS), TDTCREATE (to create TD-TCS) and TDADDPAGE instructions that causes memory belonging to a TD 220 to be encrypted using the TD's unique encryption key that is not visible or accessible to the TDRM 180 or other TDs. Before executing any instructions belonging to a TD, all TD memory is encrypted using the TD's unique key. Although specific instruction names are referenced herein, other names for the instructions may be utilized in implementations of the disclosure and are not limited to the specific names provided herein.

In one implementation, the TDRM 180 can launch each TD 220 with a small software image (similar to IBB or Initial Boot Block) after signature verification and record the IBB measurements (for subsequent attestation) using a platform root of trust. It is the IBB software executing in the TD 220 that is responsible for completing the measured launch of the TD 220 and requesting additional resources from the TDRM 180. The TD 220 has the option to use a single encryption key for the entire TD 220 or use additional encryption keys for different Tenant VMs 225A, 225B (and/or containers or different memory resources such as NVRAM) when running inside the TD 220. Thus, when the TD 220 is first set up, the TD 220 is using an exclusive CPU-generated MK-TME key. Thereafter, the TD 220 may optionally set up additional MK-TME encryption keys for each tenant software-managed context that operates inside the TD 220 (e.g., tenant VMs 225A, 225B, containers or other memory types).

In order to minimize software compatibility impact on VMMs both for CSP (e.g., TDRM root VMM 180 and tenant VMM 222), virtualization (e.g., VMX) operation may remain unmodified inside a TD 220 in TD architecture 250. Similarly, operation of VMM software, such as extended page table (EPT) management, can remain under the control of the tenant VMM 222 (if one is active in the TD 220 and is not managed by the TDRM 180). As the TDRM 180 assigns physical memory for each TD 220, the TD architecture 250 includes the MOT (i.e., MOT 160 described with respect to FIGS. 1A and 1B). The processor 112 consults the TDRM 180-managed MOT to assign allocation of memory to TDs 220. This allows the TDRM 180 the full ability to manage memory as a resource without having any visibility into data resident in assigned TD memory. In some implementations, as discussed above, the platform (e.g., root) VMM and TDRM 180 may be in the same encryption key domain, thus sharing the memory management and scheduler functions (but still remaining outside the Tenant's TCB).

Figure 3:
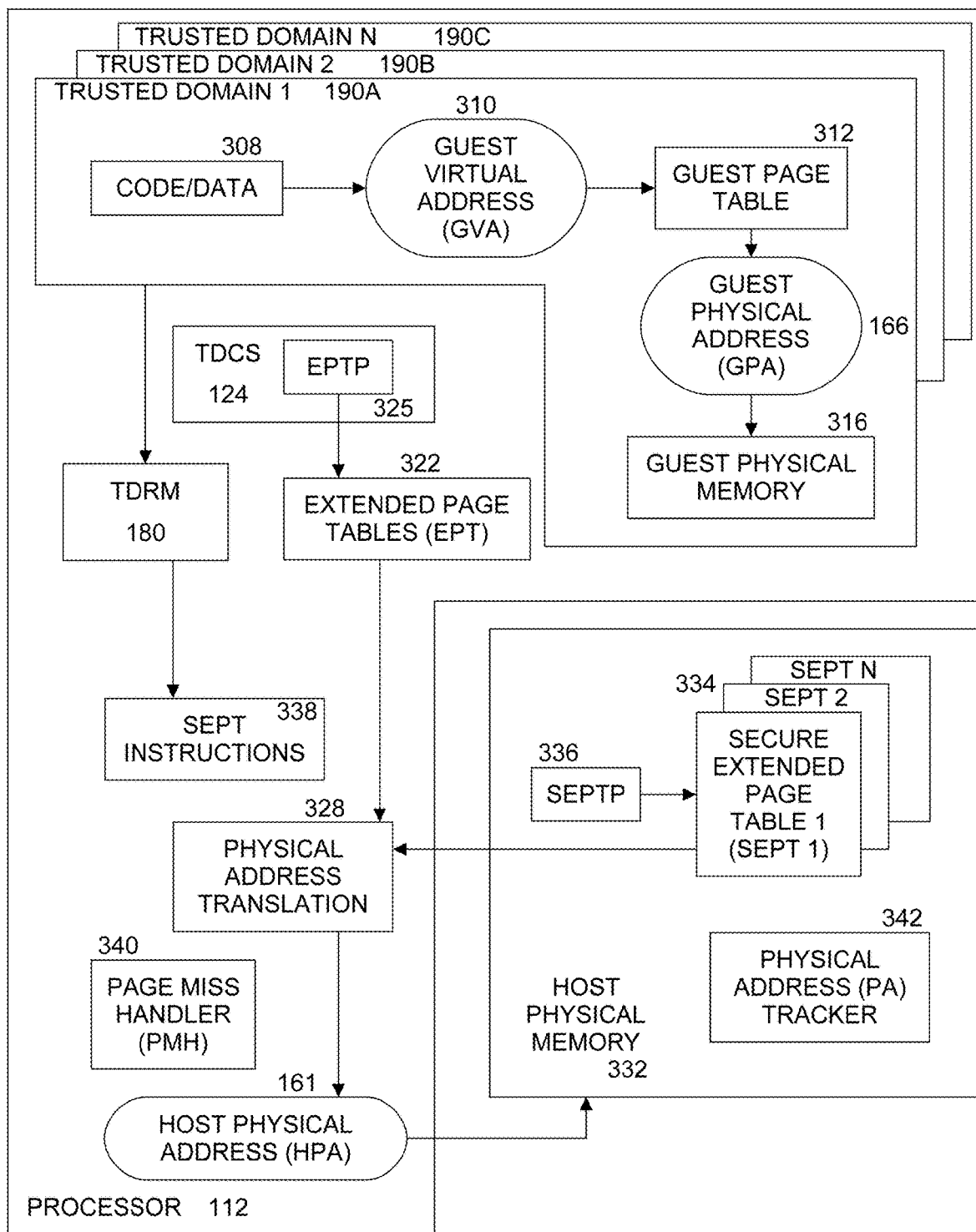
FIG. 3 illustrates another example computing system.

In an embodiment, FIG. 3 illustrates an example computing system 300. One or more Trusted Domains (TDs) from TD 1 190A, TD 2 190B, . . . TD N 190C, where N is a natural number, may be instantiated on computing system 300. Each TD includes code/data 308, which may include references to one or more guest virtual addresses (GVAs) 310. To translate a GVA into a physical address that can be used to access a portion of the computing system's physical memory, a TD may use guest page table 312. Thus, GVA 310 may be translated using guest page table 312 to guest physical address (GPA) 166. GPA 166 may then be mapped to a host physical address (HPA) 161 via EPTs 322, to access host physical memory 332.

Figure 4:
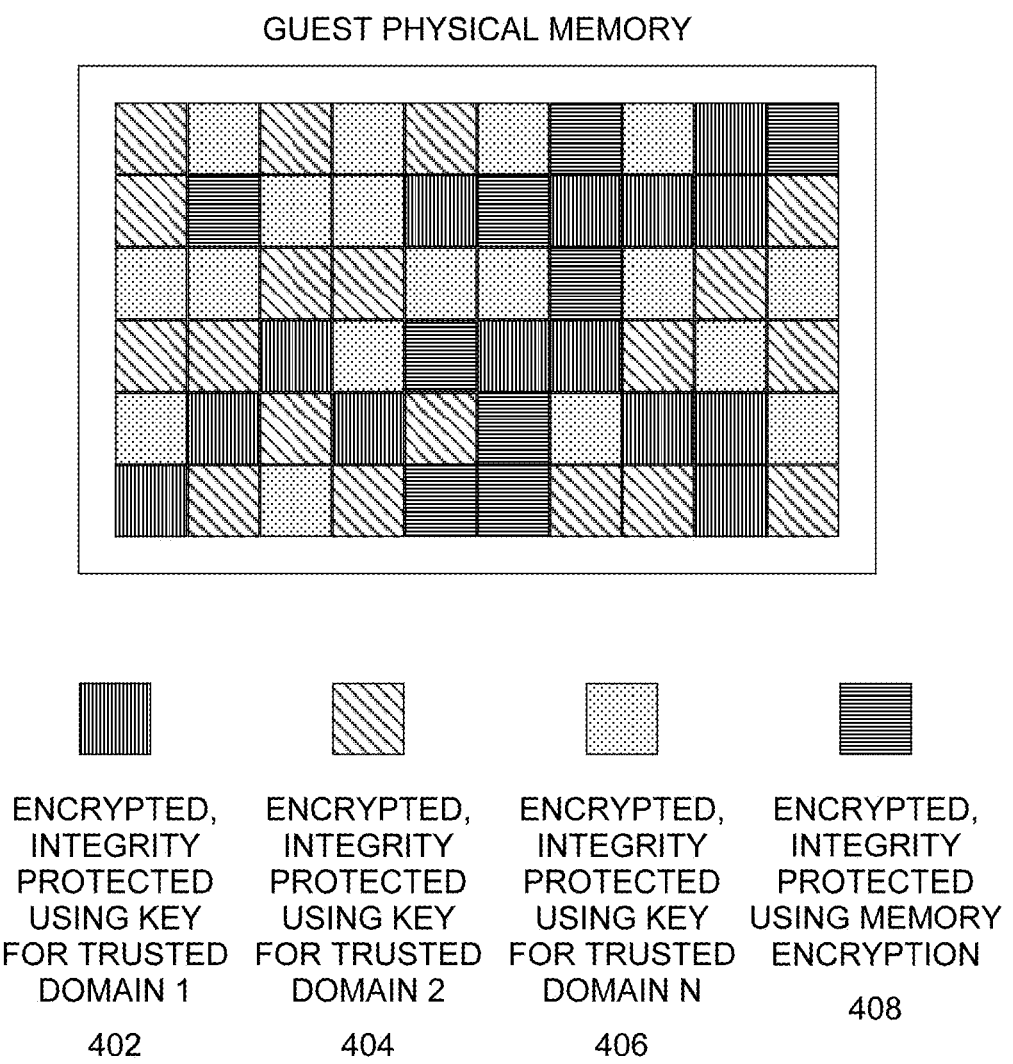
FIG. 4 illustrates an example physical memory.

FIG. 4 illustrates an example guest physical memory 316. In this example, a plurality of memory pages is shown, with each page associated with a TD being protected by encryption using a different key, such as a unique private key for each TD. For example, pages 402 associated with TD 1 190A may be encrypted with TD 1's key, pages 404 associated with TD 2 190B may be encrypted with TD 2's key, and so on, until pages 406 associated with TD N 190C may be encrypted with TD N's key. Pages 408 not associated with a TD may be protected using memory encryption as is known.

Figure 5:
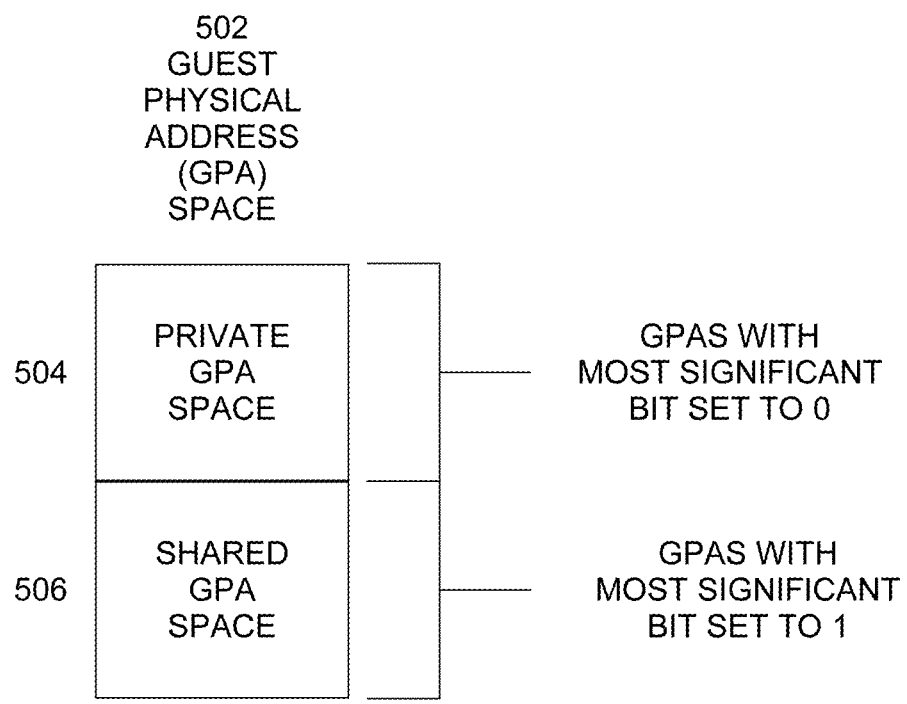
FIG. 5 illustrates an example partition of guest physical address (GPA) space.

FIG. 5 illustrates an example partition of guest physical address (GPA) space. The TD architecture partitions the guest physical address space 502 for guest physical memory 316 into two parts—a private address space 504 and a shared address space 506. Access to pages mapped to private address space 504 may be encrypted and integrity protected with a private key of a TD. Access to pages mapped to the shared address space 506 may be encrypted and integrity protected with a key shared by TD 190A and TDRM 180. In an embodiment, the most significant bit of the GPA is termed as a "Shared" bit. In other embodiments, another predetermined bit of the GPA may be used to indicate shared vs. private status.

Turning back to FIG. 3, TDRM 180 sets up an untrusted EPT 322 that provides the translation of GPA 166 with the "Shared" bit set to 1 (i.e. shared pages). The pointer to this EPT (EPTP) 325 (as specified by the TDRM and stored Trusted Domain Control Structure (TDCS) 124) may be programmed by Page Miss Handler (PMH) 140 of processor 112 when the processor enters a TD mode and may be cleared when the processor exits the TD mode.

Embodiments of the present invention introduce one or more secure EPTs (SEPTs) 334 that may be built and managed by the processor 112 hardware. Each TD may have an associated SEPT. After system initialization, the SEPT structure is the same as the EPT, except memory for SEPT pages are protected using TD ephemeral keys (i.e., pages are encrypted and integrity protected). In one embodiment, some of the SW Available/Ignored bits in the SEPT are reserved in the SEPT entries so that the CPU can store micro-architectural state information as needed (such as locks, GPA state, etc.).

The pointer to the SEPT (called SEPTP) 336 may be programmed by Page Miss Handler (PMH) 140 of the processor when the processor enters a TD mode and is cleared when the processor exits TD mode. SEPTs 334 and SEPTP 336 may be stored in a protected area of host physical memory 332 and may not be accessible by or known by TDs. SEPTs 334 and SEPTP 336 may only be accessed by certain components of processor 112 such as page miss handler 140, SEPT instructions 338, and physical address translation 328. In an embodiment, the SEPTs 334 may be stored in protected memory within host physical memory 332. In another embodiment, a SEPT for a TD 190A may be stored in encrypted pages of guest physical memory 316, with the pages being encrypted using the TD's private key.

Figure 6:
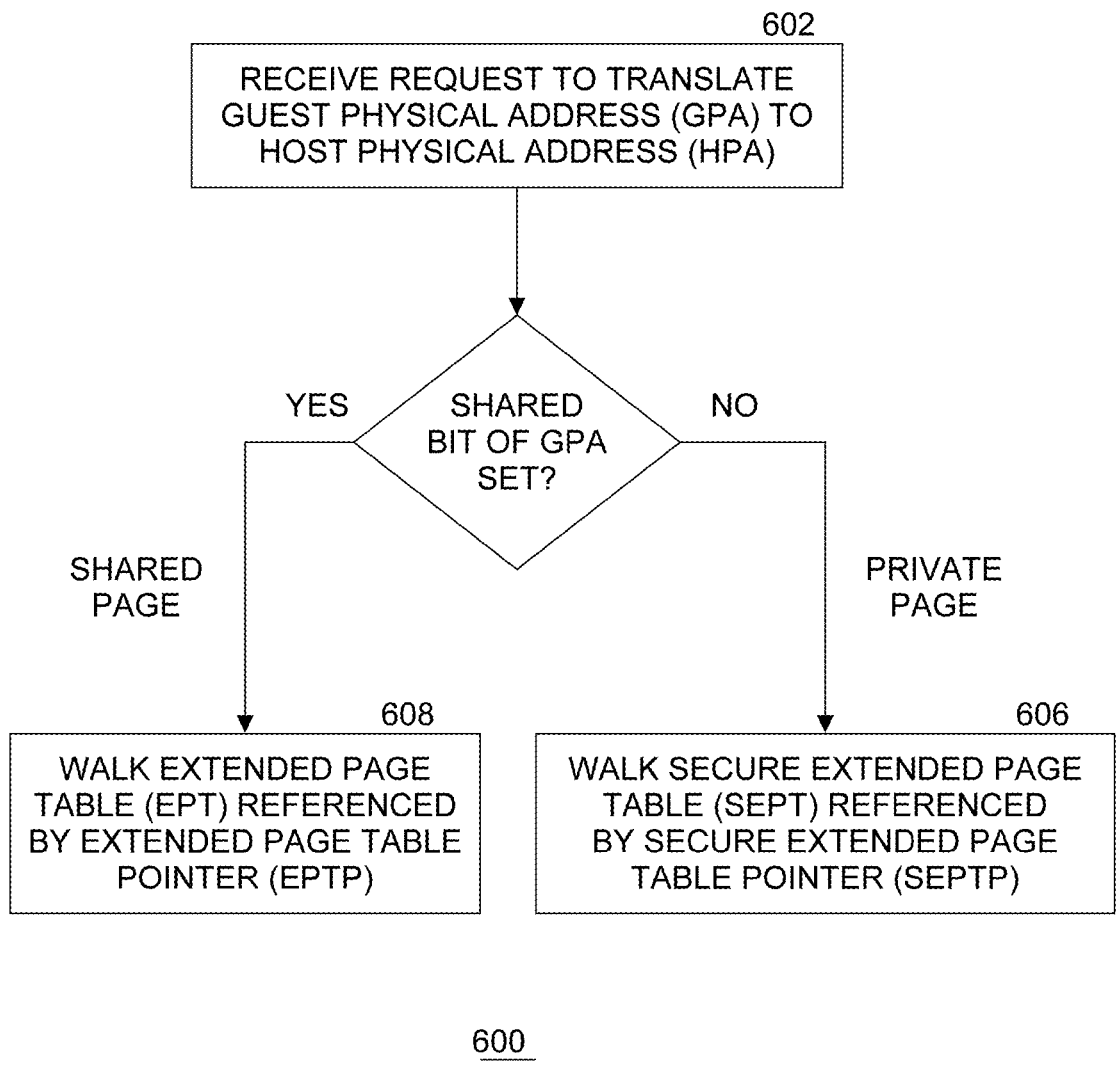
FIG. 6 illustrates an example logic flow of handling address translation for shared pages and private pages.

FIG. 6 illustrates an example logic flow 600 of handling address translation for shared pages and private pages. Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

At block 602, PMH 140 receives a request to translate a guest physical address (GPA) 166 to a host physical address (HPA) 161. At block 604 PMH 140 checks the "Shared" bit of the GPA. When the PMH is requested to translate a GPA with the "Shared" bit set to 0 (i.e., a private page) to a HPA at block 606 the PMH walks (i.e., using known page address translation techniques) the SEPT 334 referenced by the SEPTP 336. For a GPA with "Shared" bit set to 1 (i.e. a shared page), at block 608 the PMH walks the EPT 322 referenced by EPTP 325. In other embodiments, the meaning of the shared bit may be flipped (i.e., a 0 means a private page and a 1 means a shared page). Fault handling/reporting changes may include that if any EPT violations are observed when the SEPTP 336 is used (for "Shared bit"=0 GPAs), an EPT violation exit qualification reports that the TD Exit occurred due to an EPT violation in the SEPT 336. Other embodiments may prevent the TD from executing further if such an EPT violation occurs from SEPT 336.

Since SEPTs 336 are built and managed by the processor, TDRM 180 (or a legacy VMM) cannot influence the GPA to HPA translations for private pages that are performed using the SEPT 334. The VMM 180 specifies the GPA to HPA when assigning pages, but once assigned cannot maliciously remap the GPA without the TD 190A being aware of it.

Turning back now to FIG. 3, physical address (PA) tracker component 342, also called Physical Address Metadata Table (PAMT), is a per 4 KB page meta-data table stored by the CPU in protected memory so that software can never access it. In an embodiment, the PA tracker is used to keep state information for each page with the following fields: PAMT.TYPE=page type—e.g., Regular, Free, TDCS, TDVPS, TDSSA, SEPT, PMDSA etc.; PAMT.OWNER=TDID for Regular, TDVPS for TDSSA; PAMT.EPOCH=for translation lookaside buffer (TLB) tracking; PAMT.LOCK=for page locking.

Figure 7:
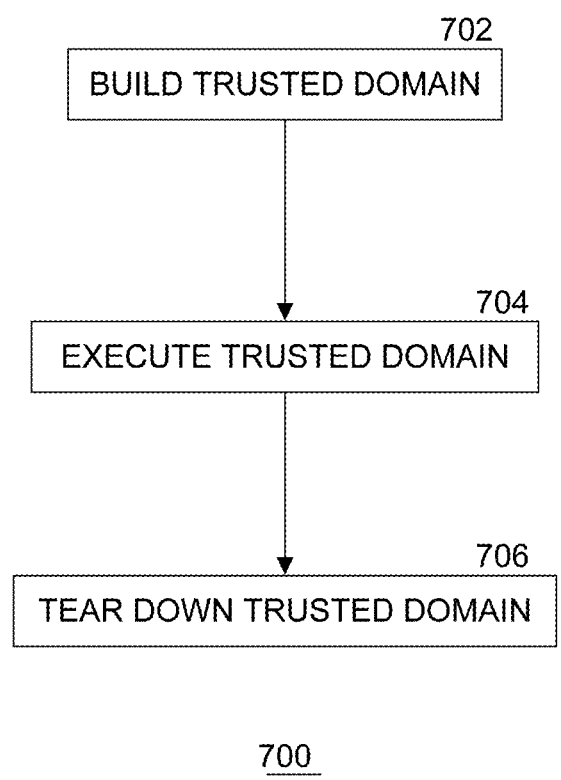
FIG. 7 illustrates an example logic flow for building, executing, and tearing down trusted domains.

FIG. 7 illustrates an example logic flow 700 for building, executing, and tearing down trusted domains. The TD lifecycle shown in FIG. 7 covers all ISA and hardware interactions for TD memory management. At block 702, a trusted domain (TD) may be built. In an embodiment, a TD Build Memory assignment/measurement) may include operations to add SEPT pages and mappings (by using a TDADDSEPT instruction), add pages to the TD with measurement (by using TDADDPAGE and TDEXTEND instructions), and add zero pages to TD post measurement (by using a TDAUGPAGE instruction).

At block 704 a trusted domain may be executed. In an embodiment, TD execution (e.g., use of assigned memory triggers PMH 140 behavior described above) may include operations for memory paging (by using TDBLOCKPAGE, TDEVICT, and TDRELOAD instructions), and for memory Frag/Defrag (by using TDBLOCKPAGE, TDPROMOTE, and TDDEMOTE instructions).

At block 706, a trusted domain may be torn down. In an embodiment, TD teardown may include operations for memory deallocation (by using TDBLOCKPAGE, and TDREMOVE instructions), and memory reclaim for SEPT 134 pages (by using a TDREMOVEPAGE instruction).

Figure 8:
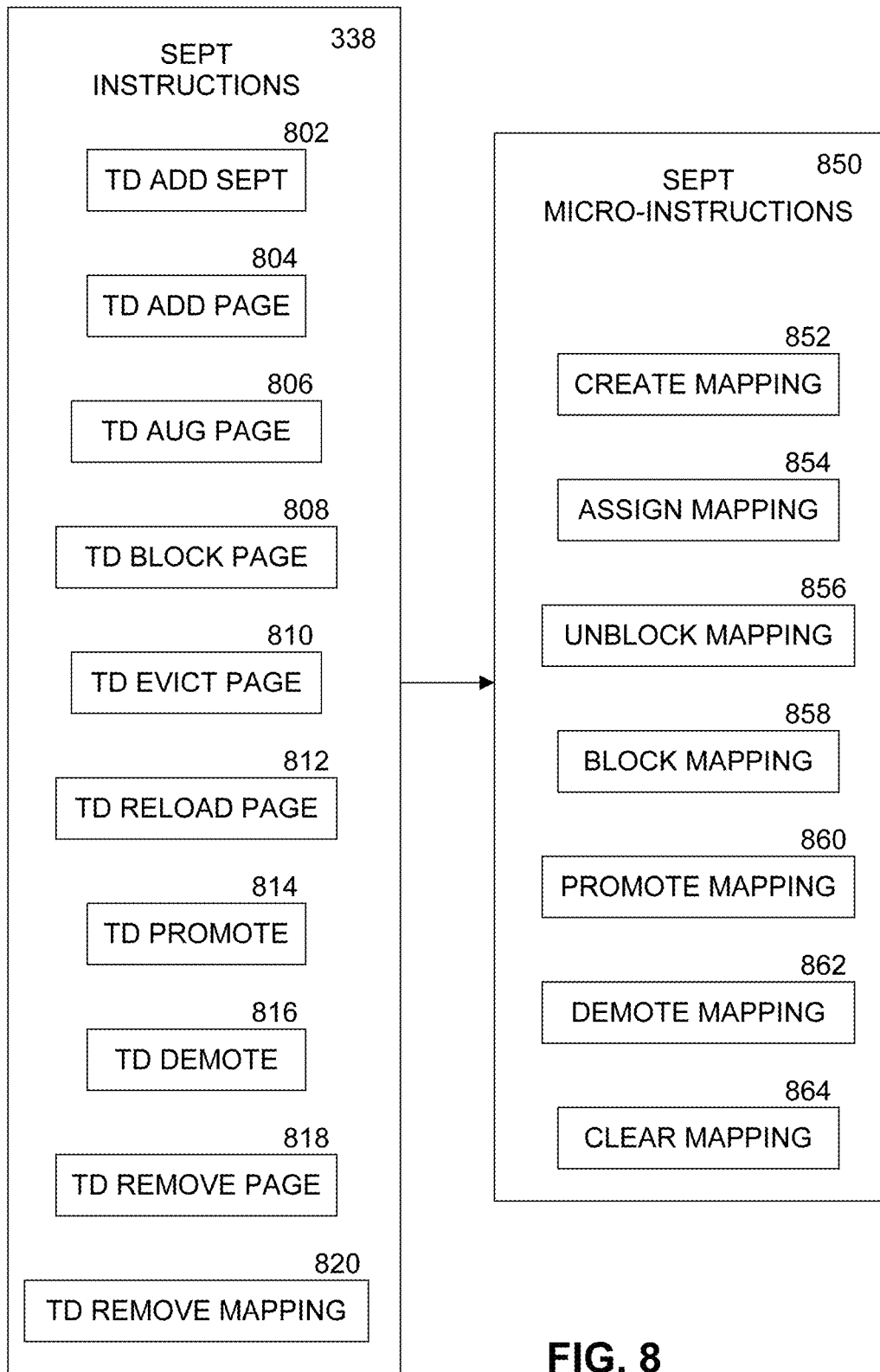
FIG. 8 illustrates an example set of secure extended page table (SEPT) instructions.

The processor provides instructions available to TDRM 180 to call to manage SEPTs 334. FIG. 8 illustrates an example set of secure extended page table (SEPT) instructions 338.

TDADDSEPT 802 This instruction adds a GPA 166 to HPA 161 mapping to the SEPT 334. This instruction adds a mapping to translate the GPA to HPA but sets the mapping as blocked from access. This mapping can be made valid only when the page HPA 161 is physically assigned to the TD 190A using the TDADDPAGE or TDAUGPAGE instruction. This instruction uses the Create Mapping microinstruction described below to update SEPT 334.

TDADDPAGE 804 This instruction adds a page to the TD 190A. The TDRM 180 specifies the initial contents of this page through a parameter. This instruction first copies the initial contents to the page such that the contents are encrypted with the private encryption key of TD 190A. Subsequently, this instruction also updates and makes the corresponding translation in the SEPT 334 valid such that the TD 190A can now access these pages. This instruction uses the Assign Mapping and Unblock Mapping microinstructions described below to update SEPT 334.

TDAUGPAGE 806 This instruction is similar to TDADDPAGE but instead of copying an initial content into the page, the instruction initializes the page to zero. This instruction uses the Assign Mapping and Unblock Mapping microinstructions described below to update SEPT 334.

TDBLOCKPAGE 808 This instruction updates the SEPT 334 mapping of the specified page to a blocked state such that the page cannot be accessed anymore from the TD 190A. This instruction uses the Block Mapping microinstruction described below to update SEPT 334.

TDEVICTPAGE 810 This instruction updates the SEPT 334 mapping of the specified page to a blocked state such that the page cannot be accessed anymore from the TD 190A. This instruction uses the Block Mapping microinstruction described below. This instruction then generates a processor key integrity enforced page meta-data that includes GPA 166, permissions and the page contents, so that the TDRM can use the HPA 166 for another TD 190B or VM.

TDRELOADPAGE 812 This instruction first validates the integrity of the page meta-data provided by TDRM 180 and updates the SEPT 334 mapping of the specified GPA 166 passing the integrity checked meta-data to the Assign Mapping and Unblock Mapping micro-instructions described below.

TDPROMOTE 814 This instruction is used by TDRM 180 to TDEVICT/TDRELOAD 4 k pages into a contiguous 2 MB region of memory to "promote" to a larger TLB mapping. The TDRM must track what HPAs 161 are assigned to TDs 190A, 190B, . . . 190C in its page frame number (PFN) database. All operating systems/VMMs that implement memory management manage the state of physical pages in a PFN database. TDRM can then subsequently request promotion/demotion of SEPT structures via this instruction which uses the Promote Mapping micro-instruction described below.

TDDEMOTE 816 This instruction is used by the TDRM to fragment a large page into a contiguous region of smaller pages to demote TLB mappings. The TDRM must track what HPAs 161 are fragmented for the TD 190A in its PFN database. The instruction updates the SEPT 334 structures via the Demote Mapping micro-instruction described below.

TDREMOVEPAGE 818 This instruction removes a page from the TD 190A. The instruction can only be performed for pages that have been previously added to a TD 190A via TDADDPAGE. (i.e. the page may not be removed until one or more valid mapping exists for the HPA 161 in the SEPT 334).

TDREMOVEMAPPING 820 This instruction removes a blocked mapping for a GPA 166 from the SEPT 334 and converts pages back to TDRM 180 ownership when no more outgoing references remain from the SEPT pages. Paging for SEPT pages 334 can be supported by similar TDMAPPINGEVICT and TDMAPPINGRELOAD variants for EPT 122 pages which store specific meta-data for SEPT 334 meta-data (as opposed to regular TD pages). In an embodiment, the instructions TDWBPAGE, TDLDPAGE (not shown in FIG. 8) mark the GPA in the SEPT as "evicted" and then capture the state of the page and encrypt it with a paging key, and the hash of the page, the GPA and the attributes.

FIG. 8 also illustrates an example set of SEPT micro-instructions 850 used in implementing the SEPT instructions 338 discussed above.

Create Mapping 852 takes in a GPA 166 as an input parameter to be mapped via SEPT 334 and one HPA 161 destination (no source) to add SEPT pages and insert mappings. Processor 112 verifies GPA 166 does not have the "Shared" bit set, else returns an error. Processor 112 performs a page walk (processor enforces HPAs 161 are not self-referential) through SEPT 334 for the provided GPA 166 establishing if a new HPA 161 is needed. During the page walk, if the page walk requires a new page for the mapping to be complete, the processor does a read check on the provided HPA using a TDRM key ID to ensure that the page is an ordinary page not assigned to any other TD 190A, . . . 190C. Alternately, the processor may use a bit map (looked up HPA) to perform this check. If the page is an ordinary page, then the processor uses the TD Key ID to perform a series of MOVDIR64 operations to clear the SEPT page directory entry (PDE)/page table entry (PTE) page (effectively updating the integrity check value in the memory controller and converting the page to a TD page). For a non-leaf extended page table entry (EPTE), the processor read-modify-writes a cache line with a modified extended page directory/table (x) cache entry (EPxE) to refer to the added HPA 161, updates a reference count for upper level EPxE. If more pages are needed for the mapping to be fully specified, the processor returns an error code to report to the OS, otherwise for a leaf EPTE, processor 112 read-modify-writes a cache line with the modified EPxE to mark GPA 166 as not-present (thus blocking the mapping).

Assign Mapping 854 takes in GPA 166, permissions, an effective address of source page and a destination HPA 161 for a final page to be assigned to the TD 190A, as input parameters. Processor 112 verifies the GPA 166 does not have the "Shared" bit set. The processor performs a page walk returning an error when the processor stalls/needs more pages (then TDRM should use TDADDSEPT to fix the error). If the page walk completes successfully, the processor checks if the mapping is marked as not-present (i.e., a blocked state). For the destination HPA 161, the processor does a read check on the provided HPA using the TDRM key ID to ensure that the page is an ordinary page not assigned to the same or another TD 190A, . . . 190C. This check also prevents aliases to the same TD page. Alternately, the processor may use a bit map (looked up HPA) to perform this check. If this check passes successfully then the processor performs a series of MOVDIR64 writes to the HPA to copy data from the source page to the destination page (either with content or zeros depending on the parameter). For the final EPTE page entry, the processor read-modify-writes to modify EPTE with the destination HPA, perms, and marks it as not-present (i.e., blocked); and updates a reference count on L2 EPTE.

Unblock Mapping 856 takes in GPA 166 as an input parameter. The processor verifies the GPA does not have the "Shared" bit set. The processor performs a page walk returning an error when the processor stalls/needs more pages (then TDRM 180 should use the TDADDSEPT instruction to fix the error). If the page walk completes successfully, the processor checks if the mapping is marked as not-present (i.e., a blocked state). For final EPTE page entry, the processor read-modify-writes to modify EPTE to mark it as present (i.e., unblocked). In an embodiment, the Assign Mapping and Unblock Mapping micro-instructions may be combined for optimizing operations.

Block Mapping 858 takes in GPA 166 as an input parameter. The processor verifies GPA does not have the "Shared" bit set. Processor 112 performs a page walk returning an error when the processor stalls/needs more pages (then TDRM should use the TDADDSEPT instruction to fix the error). If the page walk completes successfully, the processor checks if the mapping is marked as present (i.e., not a blocked state). For final EPTE page entry, the processor read-modify-writes to modify EPTE to mark it as not-present (blocked).

Promote Mapping 860 takes in a GPA 166 and desired size as input parameters. Processor 112 verifies GPA does not have the "Shared" bit set. The processor performs a page walk returning an error when the processor stalls/needs more pages (then TDRM should use the TDADDSEPT instruction to fix the error). If the walk completes successfully, the processor checks if the mapping is marked as not-present (i.e., a blocked state). The processor checks the PDE for the reference count maintained at inner levels (for lower levels) via 9 EPxE available bits and that the page table entry (PTE) page is fully populated (i.e., 512 entries), and all entries are contiguous in HPA space and are marked as blocked. On a success, the processor returns the HPA of the intermediate SEPT page 334 so that the TDRM can TDREMOVE those pages, and unblocks the 2 MB mapping in the SEPT.

Demote Mapping 862 takes in a first HPA, GPA 166, and desired (smaller) size as input parameters. Processor 112 verifies GPA does not have "Shared" bit set. The processor performs a page walk returning an error when the processor stalls/needs more pages (then TDRM should use the TDAD- DMAPPING instruction to fix the error). If the walk completes successfully, the processor checks if the mapping is marked as not-present (i.e., a blocked state). The processor checks that the leaf EPTE page size should be larger than desired (smaller) size and caches a second HPA of the EPTE and a third HPA of the destination large page. For the first fragmented GPA (for example, the first 4 KB of 2 MB region), the processor uses the Create Mapping micro-instruction passing in the GPA of the first fragment region and the first HPA to initialize the new PTE page. On success, for the remaining fragments, the processor uses the Assign Mapping and Unblock Mapping micro-instructions (using offsets from GPA and the third HPA3) to update the EPTEs corresponding to each fragment in the PTE page setup by the Create Mapping micro-instruction in the prior step. The processor updates the reference count for the upper level EPTE (i.e., the second HPA2).

Clear Mapping 864 takes in a GPA 166 as an input parameter. Processor 112 verifies GPA does not have the "Shared" bit set, else the processor returns an error. The processor performs a page walk (processor enforces that HPAs 161 are not self-referential) through SEPT 334 for the provided GPA, establishing if SEPT 334 is not setup, if not the processor returns an error. On reaching the leaf EPTE (the processor caches the previous level entry HPA), the processor read-modify-writes the cache line to update the leaf EPxE to clear the HPA and mark EPTE as not-present (thus blocking the mapping). The processor updates an upper level reference count, and returns the level and reference count to the OS (so that the OS can retry recursively to remove all SEPT pages).

Figure 9:
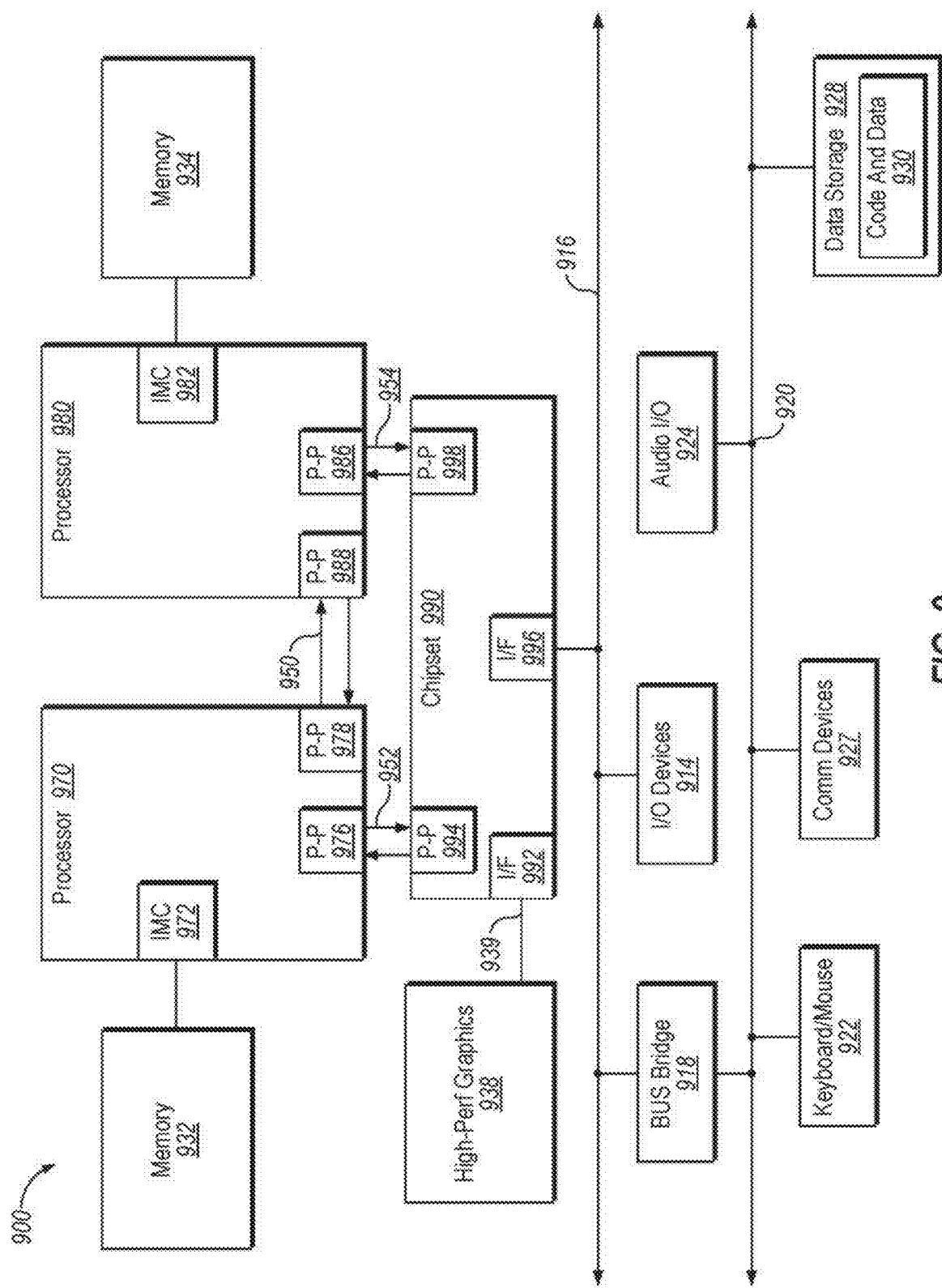
FIG. 9 illustrates an example set of SEPT micro-instructions.

Implementations may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations of the providing isolation in virtualized systems using trust domains can be implemented in the processing device 970, processing device 980, or both.

While shown with two processing devices 970, 980, it is to be understood that the scope of the disclosure is not so limited. In other implementations, one or more additional processing devices may be present in a given processing device.

Processing devices 970 and 980 are shown including integrated memory controller units 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processing devices 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processing device or outside of both processing devices, yet connected with the processing devices via Pp interconnect, such that either or both processing devices' local cache information may be stored in the shared cache if a processing device is placed into a low power mode. Chipset 990 may be coupled to a first bus 916 via an interface 996. In one implementation, first bus 916 may be a Peripheral Component Interconnect (PCI) bus, or a bus such as a PCI Express bus or another third generation 1/0 interconnect bus, although the scope of the disclosure is not so limited.

As shown in FIG. 9, various 1/0 devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio 1/0 924 may be coupled to second bus 920. Note that other architectures are possible. For example, instead of the point-to-point architecture of FIG. 9, a system may implement a multi-drop bus or other such architecture.

Figure 10:
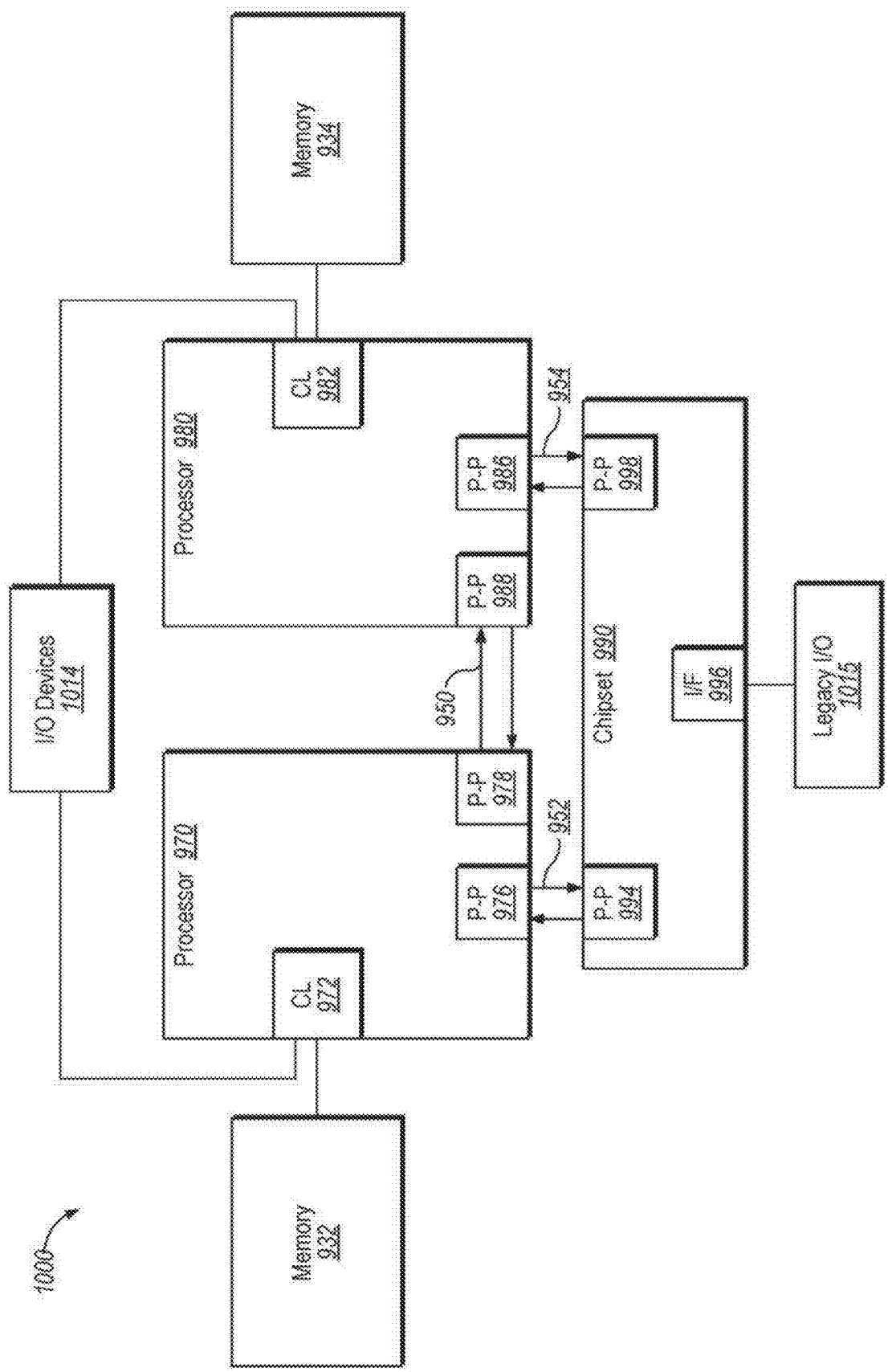
FIG. 10 is a block diagram of a computer system according to another implementation.

Referring now to FIG. 10, shown is a block diagram of a third system 1000 in accordance with an implementation of the disclosure. FIG. 10 illustrates that the processing devices 970, 980 may include integrated memory and I/O control logic ("CL") 972 and 982, respectively. For at least one implementation, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 1014 are also coupled to the control logic 972, 982. Legacy I/O devices 1015 are coupled to the chipset 990. The implementations of the providing isolation in virtualized systems using trust domains can be implemented in processing device 970, processing device 980, or both.

Figure 11:
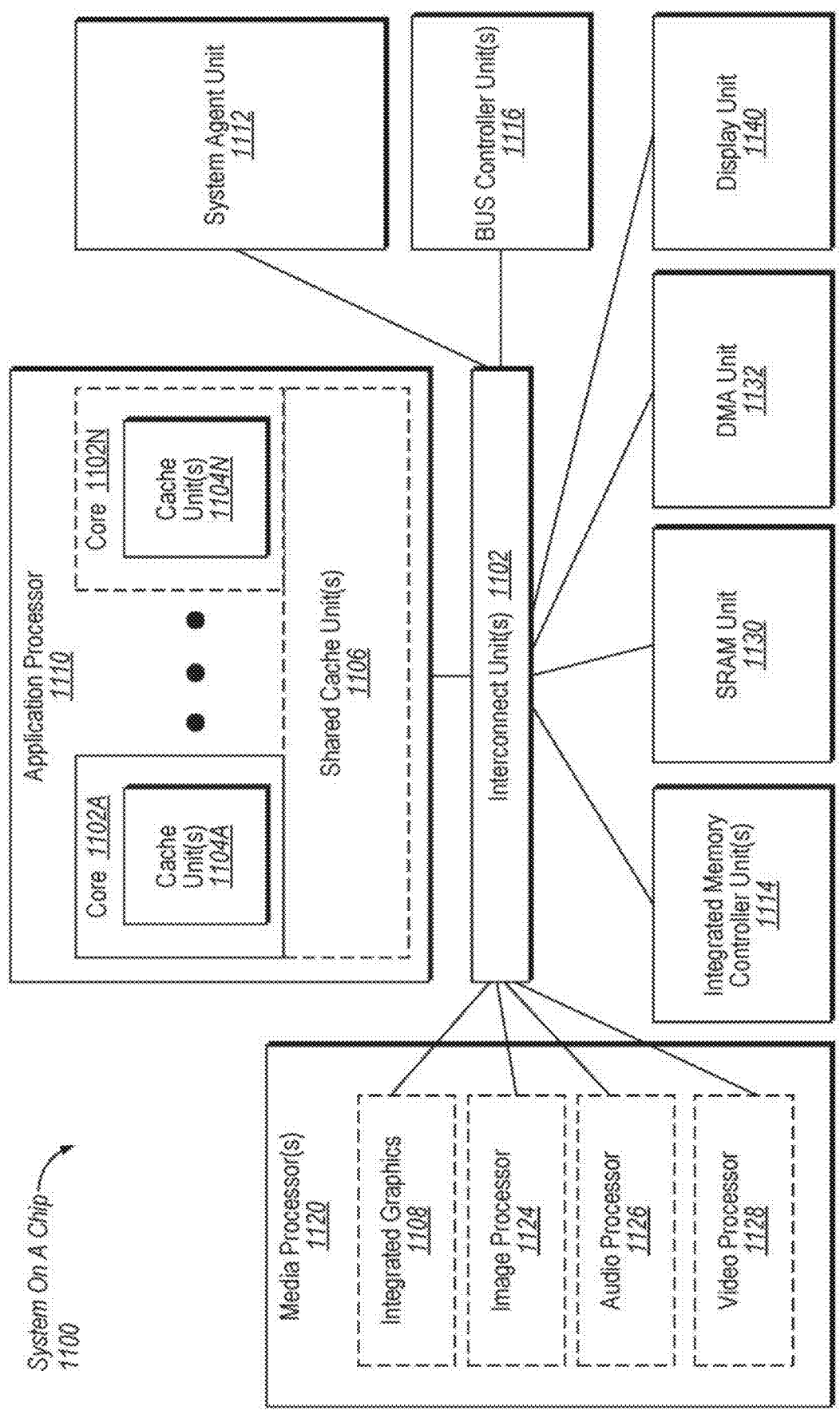
FIG. 11 is a block diagram of a system-on-a-chip according to one implementation.

FIG. 11 is an example system on a chip (SoC) that may include one or more of the cores 1102. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to an application processing device 1110 which includes a set of one or more cores 1102A-N and shared cache unit(s) 1106; a system agent unit 1112; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations of the providing isolation in virtualized systems using trust domains can be implemented in SoC 1100.

Figure 12:
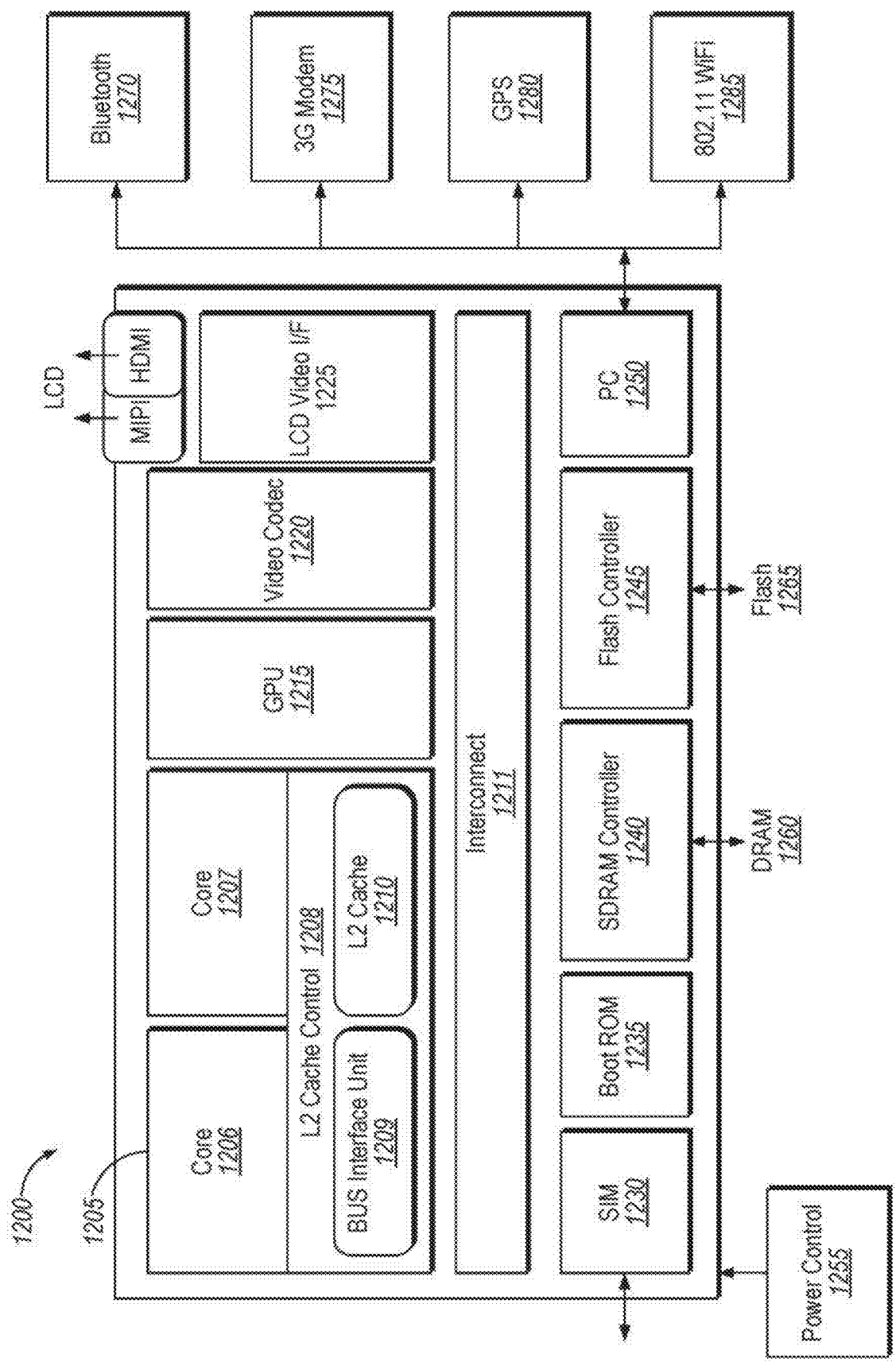
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. AUE may connect to a base station or node, which can correspond in nature to a mobile station (MS) in a GSM network. The implementations of the providing isolation in virtualized systems using trust domains can be implemented in SoC 1200.

Here, SoC 1220 includes 2 cores-1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
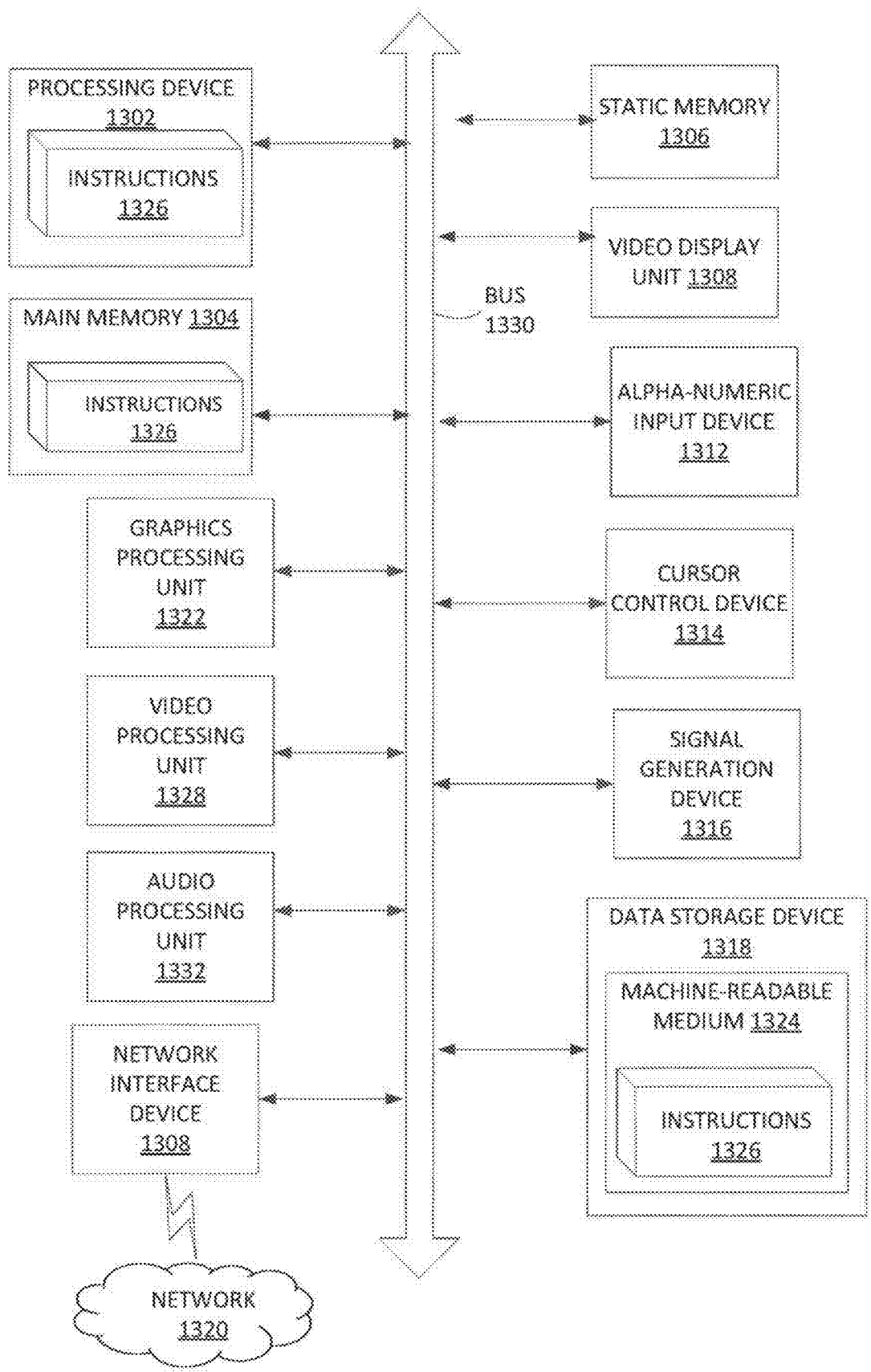
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1300.

The computing system 1300 includes a processing device 1302, main memory 1304 (e.g., read-only memory (ROM), flash memory, dynamic random-access memory (DRAM) (such as synchronous DRAM (SDRAM) or DRAM (RDRAM), etc.), a static memory 1306 (e.g., flash memory, static random-access memory (SRAM), etc.), and a data storage device 1318, which communicate with each other via a bus 1330.

Processing device 1302 represents one or more general-purpose processing devices such as a micro-processing device, central processing unit, or the like. More particularly, the processing device may be complex instruction set computing (CISC) micro-processing device, reduced instruction set computer (RISC) micro-processing device, very long instruction word (VLIW) micro-processing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or processing device cores. The processing device 1302 is configured to execute the processing logic 1326 for performing the operations discussed herein. In one implementation, processing device 1302 can be part of the computing system 100 of FIG. 1. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer readable storage medium" shall accordingly be taken to include, but not be limited to, solid-state memories, and optical and magnetic media.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to providing isolation in virtualized systems using trust domains in specific integrated circuits, such as in computing platforms or micro-processing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Apparatus and Method for Secure Memory Access Using Trust Domains

In one embodiment, a process address space ID (PASID) is associated with a trust domain (TD) and used to securely access the trust domain. Additional instructions are provided which track assignment of the PASID to the TD and restrict the TD to generating ENQ* requests only with assigned PASID. In addition, one embodiment tracks assignment of device functions or PASID to the TD through trusted IO memory management unit (IOMMU) translation tables used for address translation for trusted devices and performs trusted IO translation lookaside buffer (IOTLB) and device TLB invalidations on behalf of the TD.

In addition, one embodiment of the invention includes high speed bus (e.g., PCIe) protocol extensions to define a device originated transaction as a "trusted or non-trusted transaction" (e.g., with a transaction header bit). Other bits may be used to denote other device capabilities post device authentication.

Finally, one embodiment includes an IOMMU hardware extension to use trusted IOMMU translation tables for trusted transactions originating from devices. A TD-specific Key ID may be associated with the translated physical address to allow DMA operations to TD private memory.

Figure 14:
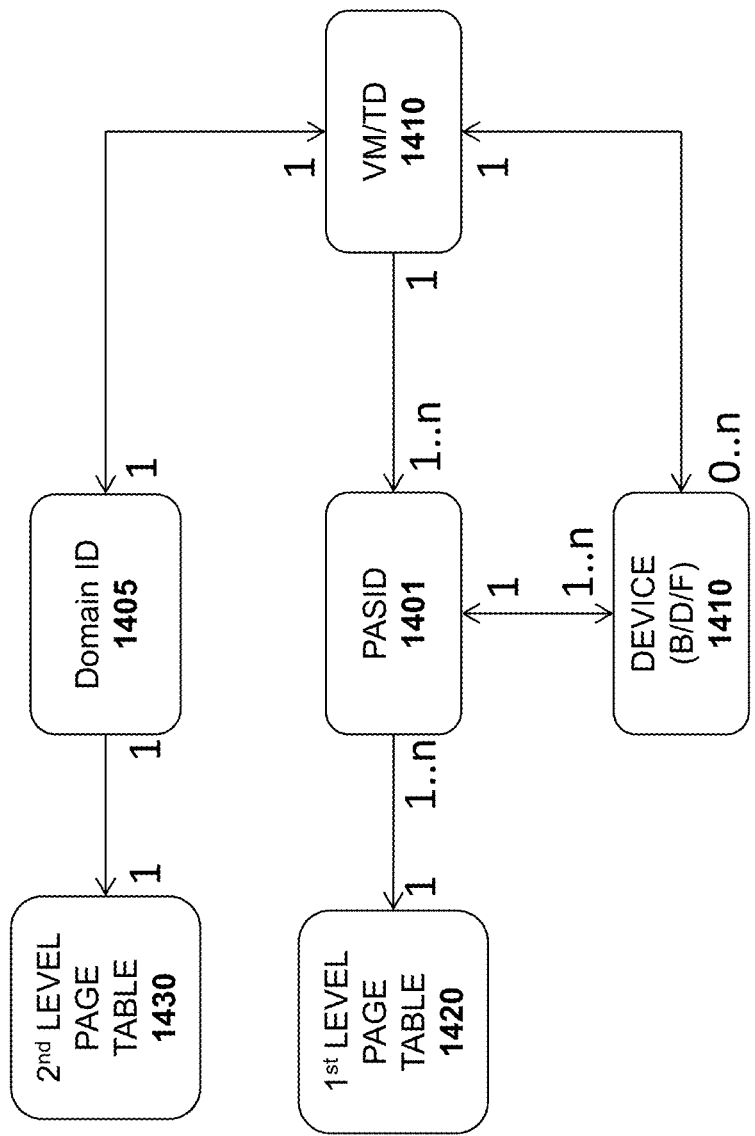
FIG. 14 illustrates a relationship between first and second level page tables and various identifiers associated with a trusted domain.

One embodiment of a trusted IO framework for a trusted domain is illustrated in FIG. 14 which shows a device 1410 coupled to a VM/TD and associated with a particular PASID 1401. The VM/TD uses the PASID 1401 to access a unique first level page table 1420 (e.g., to perform a guest virtual address (GVA) to guest physical address (GPA) translation). With the address retrieved from the first level page table 1420, the VM/TD uses its Domain ID 1405 to access the second level page table 1430 (e.g., using techniques described above).

In the device assignment model to a virtual machine (VM), the TD belongs to a unique domain, identified by domain ID 1405, and each TD domain ID 1405 is associated with a second level page table 1430 that provides translation of GPAs to HPAs. In one embodiment, the second level page table 1430 comprises the Secure EPT page table described above. Each TD domain may be assigned 1 to N PASIDs while a given PASID can be assigned to only one TD domain. A TD domain may be assigned 0 to N device functions (b/d/f) while a direct assigned device fn. can be assigned to only one TD. A PASID 1401 may be associated with a first level page table 1420 and a first level page table 1420 may be associated with 1 to N PASIDs.

The trusted IO framework described herein provides for Trusted Attestation, Trusted Provisioning, Trusted MMIO, and Trusted DMA. For Trusted Attestation, device certificates are used as evidence of the authenticity of the device. One embodiment provides reporting of the security posture and device configurations.

Trusted Provisioning may include provision secrets (keys, etc.), establishment of access controls to MMIO registers and to TD private memory. For Trusted MMIO and DMA, confidentiality, integrity and replay-protection techniques are implemented as well as signaling of trusted transactions to/from the device and access-control enforcement.

Figure 15:
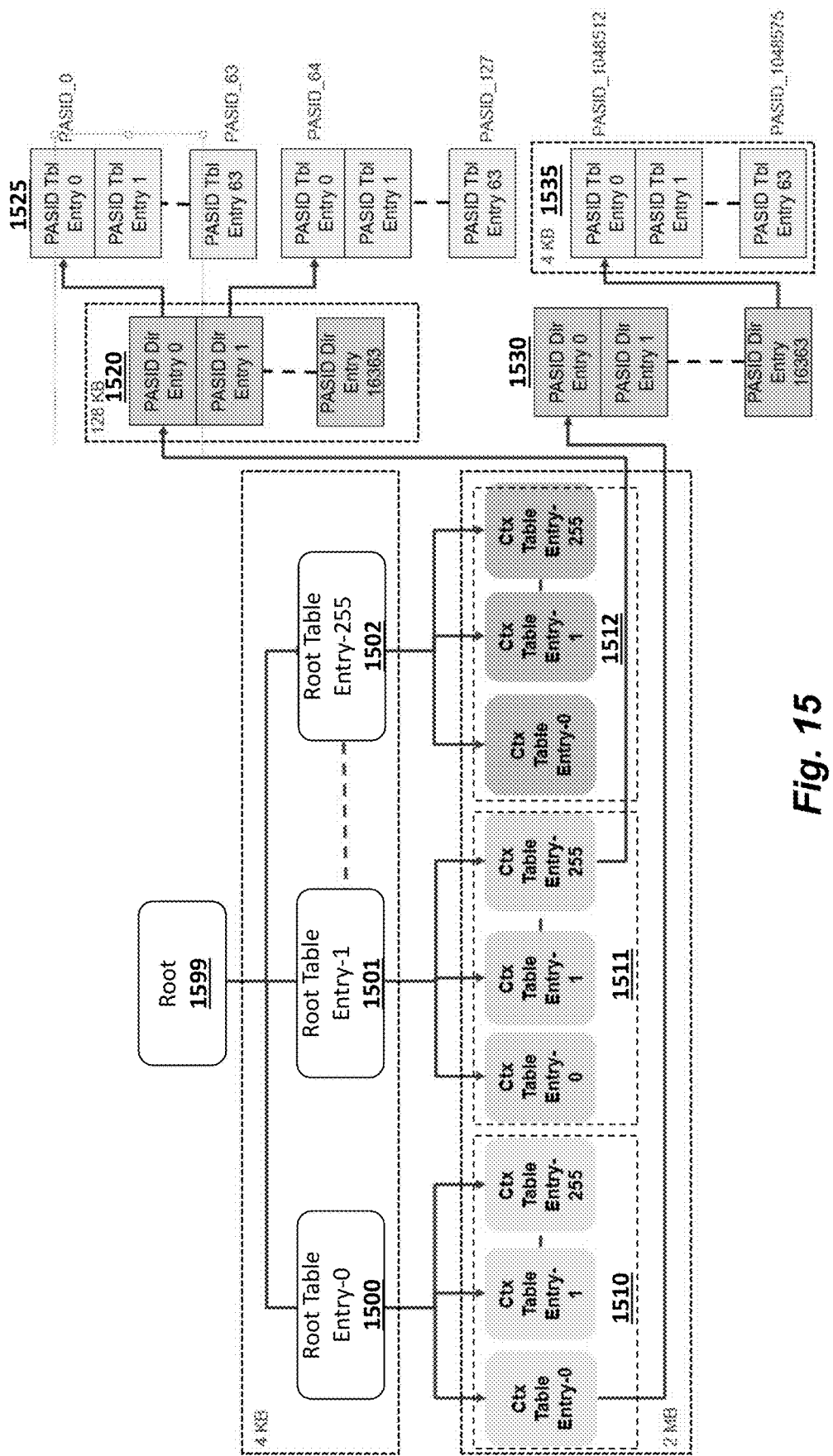
FIG. 15 illustrates an example of a root table, context table and PASID table.

In one embodiment, the IOMMU uses a tree like data structure to enforce access control. In FIG. 15, the tree structure includes a root table 1599 with a plurality of root table entries 1500-1502, each of which identify a context table 1510-1512. A context table entry may identify a plurality of PASID directory entries 1520, 1530 which, in turn, identify a set of PASID table entries 1525, 1535.

In one embodiment, the IOMMU uses a requester ID (RID) which is composed of a bus number, device number and function number to identify a device. The RID is part of the DMA transactions and is carried in the header of the transaction packets. The DMA transactions from the device can optionally carry a PASID that identifies a unique IO context in the device. If the transaction does not carry the PASID then the IOMMU uses a default PASID value as configured in the IOMMU data structures.

As mentioned, the root of this data structure is a root table 1599 and the address of the root table is programmed into the IOMMU by the virtual machine monitor (VMM). In one embodiment, the root table 1599 is indexed by the bus number in the RID and each root table entry 1500-1502 points to a context table 1510. The context table entries 1510-1512 are indexed by the (device number+Function number) in the RID and points to the PASID directory table 1520, 1530. The context table entry is programmed with the PASID number to use if the device DMA transaction did carry a PASID header. The PASID directory is indexed by the upper 14 bits of the PASID number and points to a PASID table 1525, 1535 which is indexed by the lower 6 bits of the PASID.

The PASID table entries 1525 then point to the first level page table (optional) and to the second level page table. If the DMA request was using a virtual address then the IOMMU uses the first level page table to translate the virtual address to a guest physical address and then uses the second level page table to translate the guest physical address to the host physical address.

Figure 16:
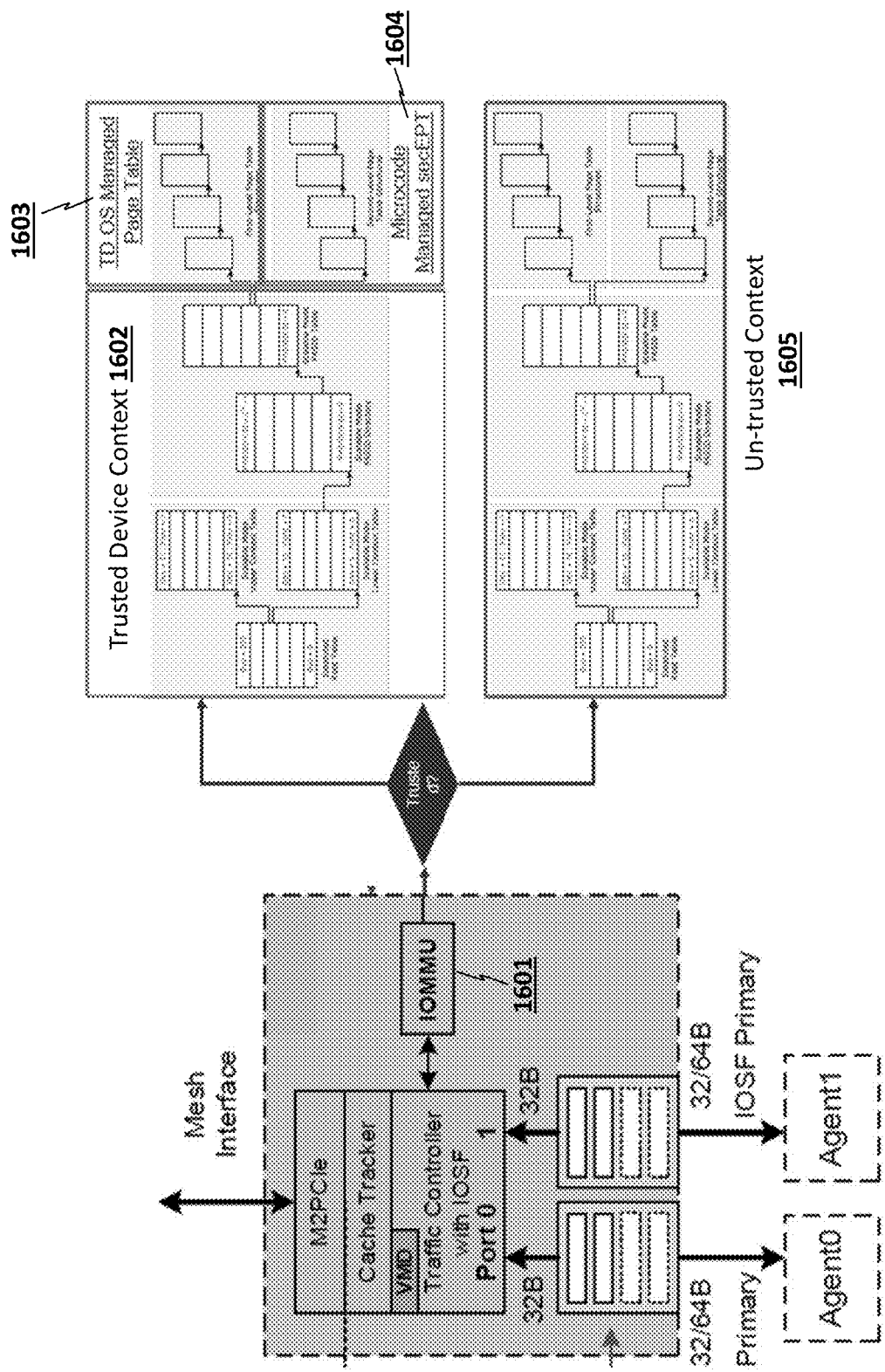
FIG. 16 illustrates an example IO memory management unit (MMU).

In one embodiment, to support Trusted IO, the VMM is not trusted to establish these IOMMU data structures. To support this security objective the IOMMU has two sets of data structures. The first set is setup by the VMM to perform access control for all devices and a second set of data structures to perform access control for trusted DMA requests to TD private pages from trusted devices assigned to trust domains. The IOMMU enforces this when the walk is performed for untrusted devices through the data structures established by the VMM. Neither those data structures nor the final physical address obtained as a result of walking those data structures can have a TD private key ID. This second set of data structures is managed by microcode through new instructions described herein. This model allows the IOMMU circuitry and logic to be mostly unchanged except to pick the right root table to start the walk for translation when a DMA request arrives from a device. An example is shown in FIG. 16, which shows an IOMMU 1601 accessing a first root table within a trusted device context 1602 for trusted transactions and a second root table for an untrusted context 1605 for untrusted transactions. In this particular example, the trusted device context maps to a trusted device OS-managed page table 1603 and a microcode managed secure EPT 1604.

The IOMMU 1601 needs to know the trusted root table address and for that a second root pointer is included in the IOMMU, referred to here as TRUSTED_ROOT_PTR, which is programmed with a second tree like data structure as shown in FIG. 16 to host the mapping for trusted devices assigned to Trust Domains. In one embodiment, this TRUSTED_ROOT_PTR is only microcode writeable and this is enforced using a security attribute of initiator (SAI) check. The TRUSTED_ROOT_POINTER may be mapped to a MMIO range specified by a new TRUSTED_IOMMU_BAR (trusted IOMMU base address register) in the IOMMU and is configured by the BIOS or VMM. The BIOS or VMM cannot however write any of the registers mapped by this MMIO range as these registers are SAI protected. The TRUSTED_IOMMU_BAR is write once and locked once configured. The TRUSTED_IOMMU_BAR also contains a set of TRUSTED_INVALIDATION_REGISTERS that can be used by microcode to invoke IOTLB and IOMMU intermediate structure caches as part of the flows that un-assign a device from a TD.

As seen from the data structure diagram in FIG. 16, the total memory requirements for the second trusted data structure can be very large. Options for memory to host this data structure include (a) stealing memory from DRAM at boot time and protect it using a range register (b) having the VMM allocate memory for this data structure at runtime. The option b) is used in one embodiment since it does not waste memory for the max size of this data structure (as would be needed by option (a)). Option (b) also allows the VMM to flexibly allocate memory and reclaim this memory when it is not needed.

However, using memory allocated by the VMM implies the need at runtime to protect the memory from being tampered with by the VMM. In one embodiment, in order to protect trusted context structures without stealing memory at boot time, a platform reserved key ID ("PKID") is used, which is a MK-TME key ID mapped to a microcode established key and is not usable by the VMM (i.e., the VMM cannot generate host page table mappings that specify the PKID in the HPAs the VMM page tables reference). The PKID is taken from the TD namespace and is not used for any TDs ephemeral key. The memory for the trusted IOMMU data structures is thus encrypted and integrity protected by the key associated with this PKID and any VMM attempt to tamper with this memory (using other HKIDs) will lead to an integrity check failure in the MK-TME engine, leading to a machine check exception.

In one embodiment, the trusted devices are authenticated and their links to the port of the bridge or the root port to which they are connected are encrypted by a trusted authentication and provisioning agent. Existing techniques are known for authenticating PCIe devices (see, e.g., PCI express Device Security Enhancements, Version 0.7, June 2018). One embodiment builds on this device authentication model with the following extensions to the PCIe protocol to enforce the trusted IO security properties. A new indicator bit is used in the PCIe transaction to indicate the request is a trusted request. The following different embodiments may be used:

Embodiment 1: Trusted Indicator in PASID TLP Prefix

Figure 17:
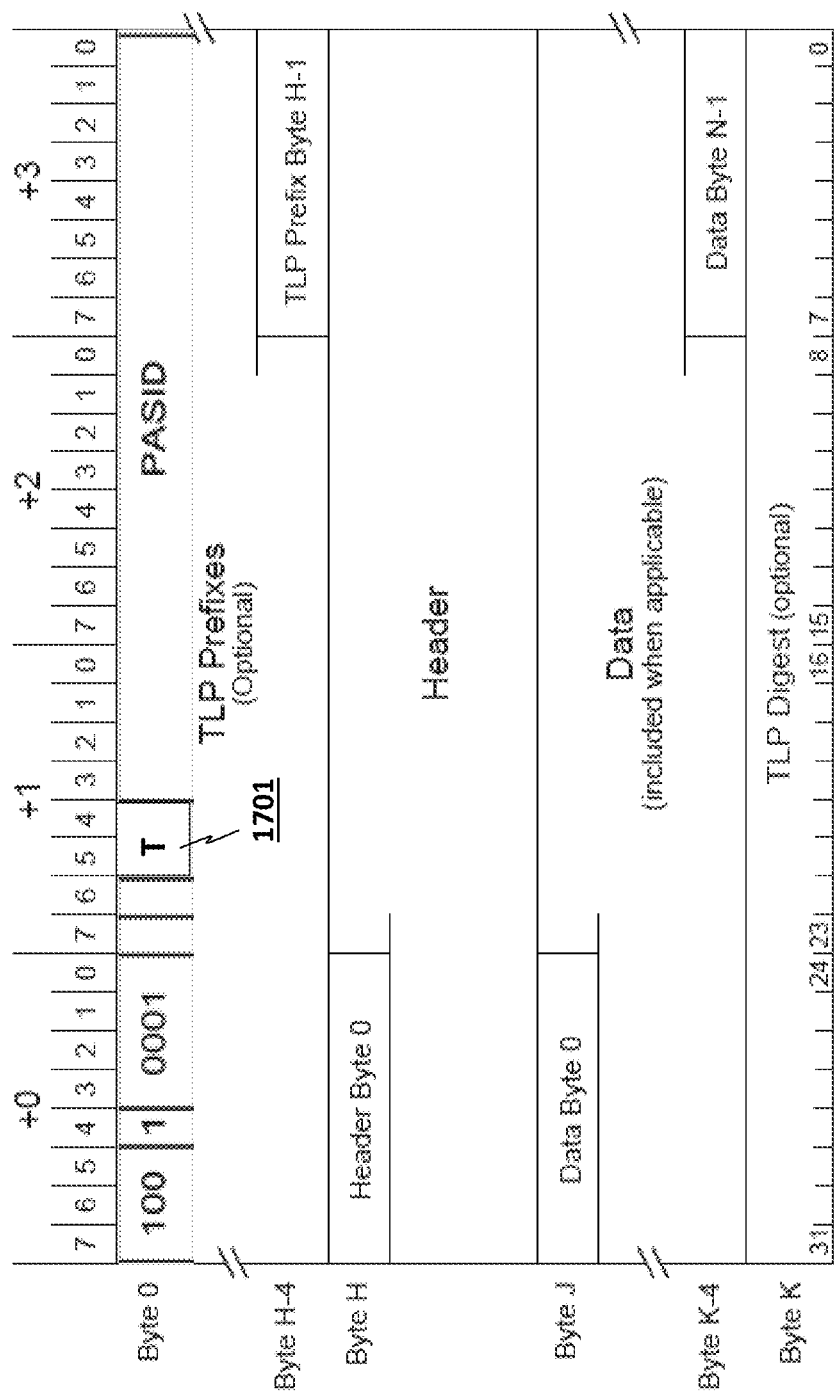
FIG. 17 illustrates an example of a TLP prefix with a trusted indicator.

Devices when generating a DMA transaction can indicate if they are trusted transactions to TD private memory or DMA to non-TD private memory using a new "T-Trusted" field 1701 in the PASID TLP prefix as shown in FIG. 17. The T field value of 00 indicates that it is an untrusted transaction and the PASID is not valid; a 01 indicates an untrusted transaction and the PASID is valid; a 10 indicates a trusted transaction and the PASID is not valid; and a 11 indicates a trusted transaction and the PASID is valid.

Figure 18:
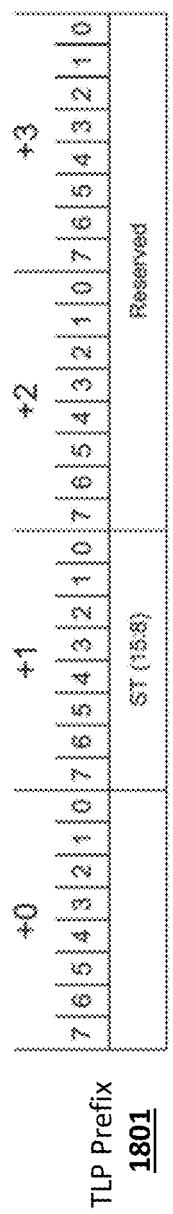
FIG. 18 illustrates an example of a TLP prefix with a trusted bit.

Embodiment 2: Trusted Indicator in the Extended Transaction Processing Hint TLP Prefix When trusted IO is enabled, the bit 0 of the TPH TLP prefix is defined as the Trusted bit. For example, a value of 0 indicates an untrusted transaction and a value of 1 indicates a trusted transaction. One embodiment of the TLP prefix is illustrated in FIG. 18.

Embodiment 3

For this implementation, a new TLP prefix is used to indicate that this is a trusted transaction.

Embodiment 4

In this embodiment, bit 63 of the address field is used to indicate this is a trusted transaction.

Embodiment 5

For this embodiment, a reserved bit or encoding in one of the existing PCIe transaction headers or TLP prefixes is used as the "trusted" bit.

In one embodiment, the IOMMU 1601 uses this "trusted" bit to determine if it should do the walk for the translation using the VMM established root pointer or the microcode established trusted root pointer. Note that the Trusted bit state in the PCIe packet is covered by the link integrity header carried to authenticate PCIe packets from an authenticated device. Hence if the device is authenticated, and the packet integrity check passes, then the Trusted bit can be evaluated. This prevents against the Trusted bit spoofing.

One embodiment of the invention implements the following requirements on the PCIe root ports and bridges to enforce trusted IO:

DEV_REQ_1:

When a request is received on a link that has been secured through authentication and link encryption, the bridge or the root port shall allow the DMA transaction to have the "trusted" bit in the header. If the request is received on a unsecured link with the trusted bit set then the root port or the bridge shall drop the transaction as a malformed transaction.

DEV_REQ_2:

When a bridge receives a transaction on a secure link with "trusted" bit set, it must not forward that transaction to an unsecured link.

DEV_REQ_3:

A bridge or root port that has been placed in trusted mode and receives a transaction on a secure link with the "trusted" bit set must verify that the bus number in the requester ID of the header is a valid bus number for that port. In the case where the port is connected to an endpoint device the bus number and the device number are valid for that port. Note that untrusted devices cannot set the "trusted" bit due to DEV_REQ_1 and DEV_REQ_2. An untrusted DMA transaction with a spoofed requester ID is not a threat as it walks the VMM established tables and, due to MK-TME encryption and integrity checks, cannot reach the TD private memory. This DEV_REQ_3 enforces ID spoofing cannot be done by trusted devices.

In one embodiment, as the IOMMU 1601 walks these context structures to speed up the translation requests it caches entries from these tables into its translation caches. The IOMMU also caches the translations in the IOTLB to allow a subsequent request to hit and thus be translated faster.

One embodiment includes a "trusted" tag bit in the IOMMU intermediate and IOTLB structures. The "trusted" bit from the transaction is used along with the requester ID and the address to lookup these structures. Thus the "trusted" tag bit provides isolation between the trusted entries and the untrusted entries in these caches.

One embodiment also includes extensions to the IOMMU context structure entries and PASID table entries. In particular, this embodiment includes a context structure entry and PASID table entry.

Context Structure Entry—

Figure 19:
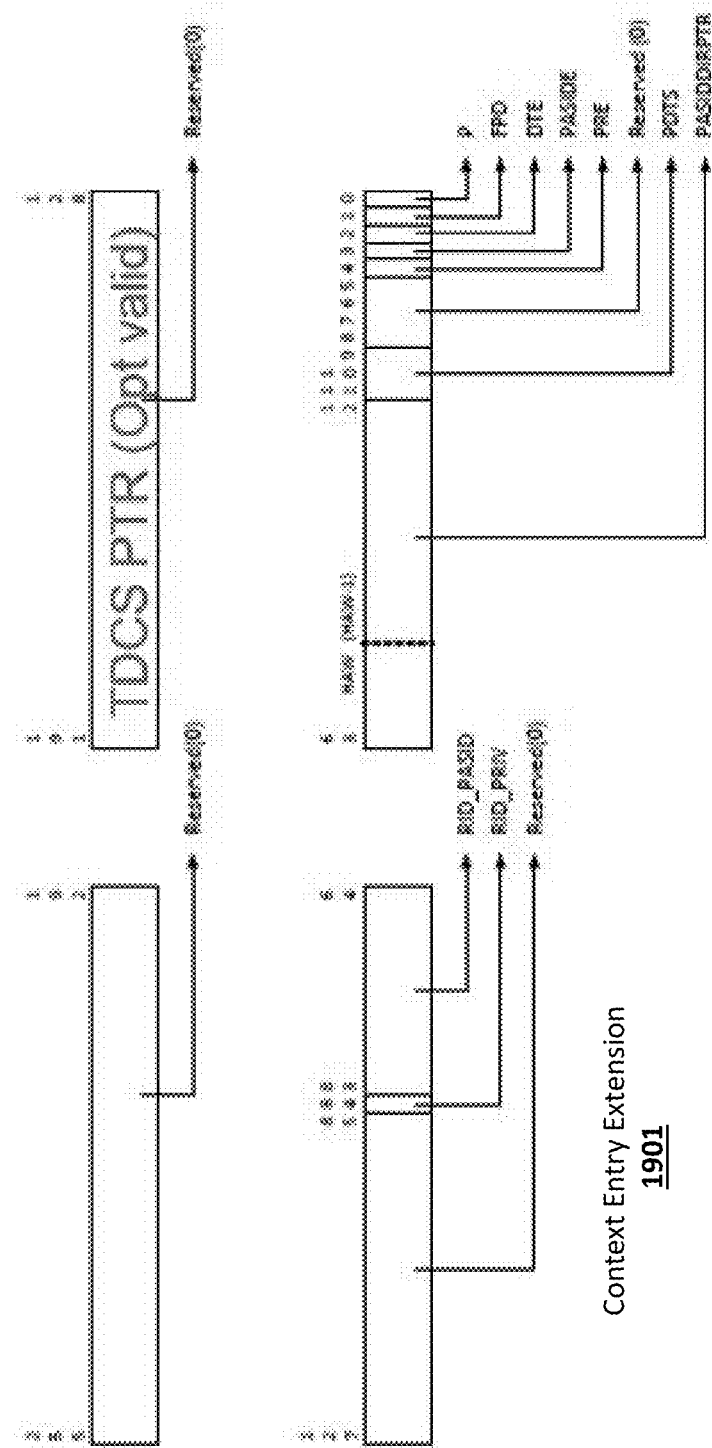
FIG. 19 illustrates an example of a context entry extension.

When a device is completely assigned to a TD all PASIDs assigned to this device must also have been those assigned to that TD. In order to perform this check the ID of the TD owning this device is recorded in the context structure entry as follows. An example context entry extension 1901 is illustrated in FIG. 19. For context structure entries in the VMM established data structure these fields remain reserved and not consumed by the IOMMU. The trusted domain control structure (TDCS) pointer when not NULL in the trusted context structure entry points to the TD control structure of the TD that owns this device. For such devices the TD can also specify the default PASID value, RID_PASID, to indicate the PASID that should be used for DMA transactions that do not carry the PASID TLP prefix.

PASID Table Entry—

Figure 20:
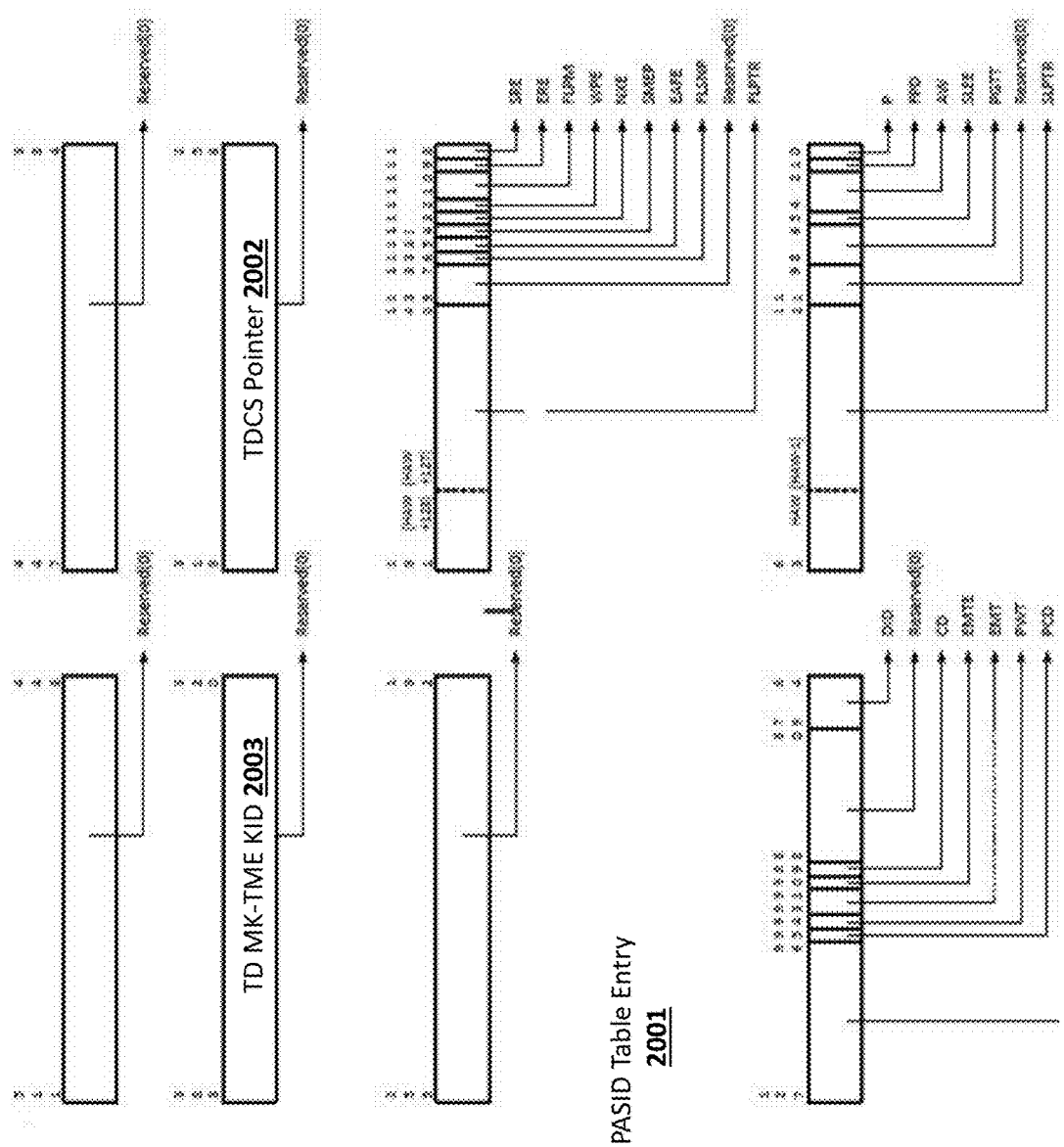
FIG. 20 illustrates one embodiment of a process address space ID (PASID) table entry.
Figure 21:
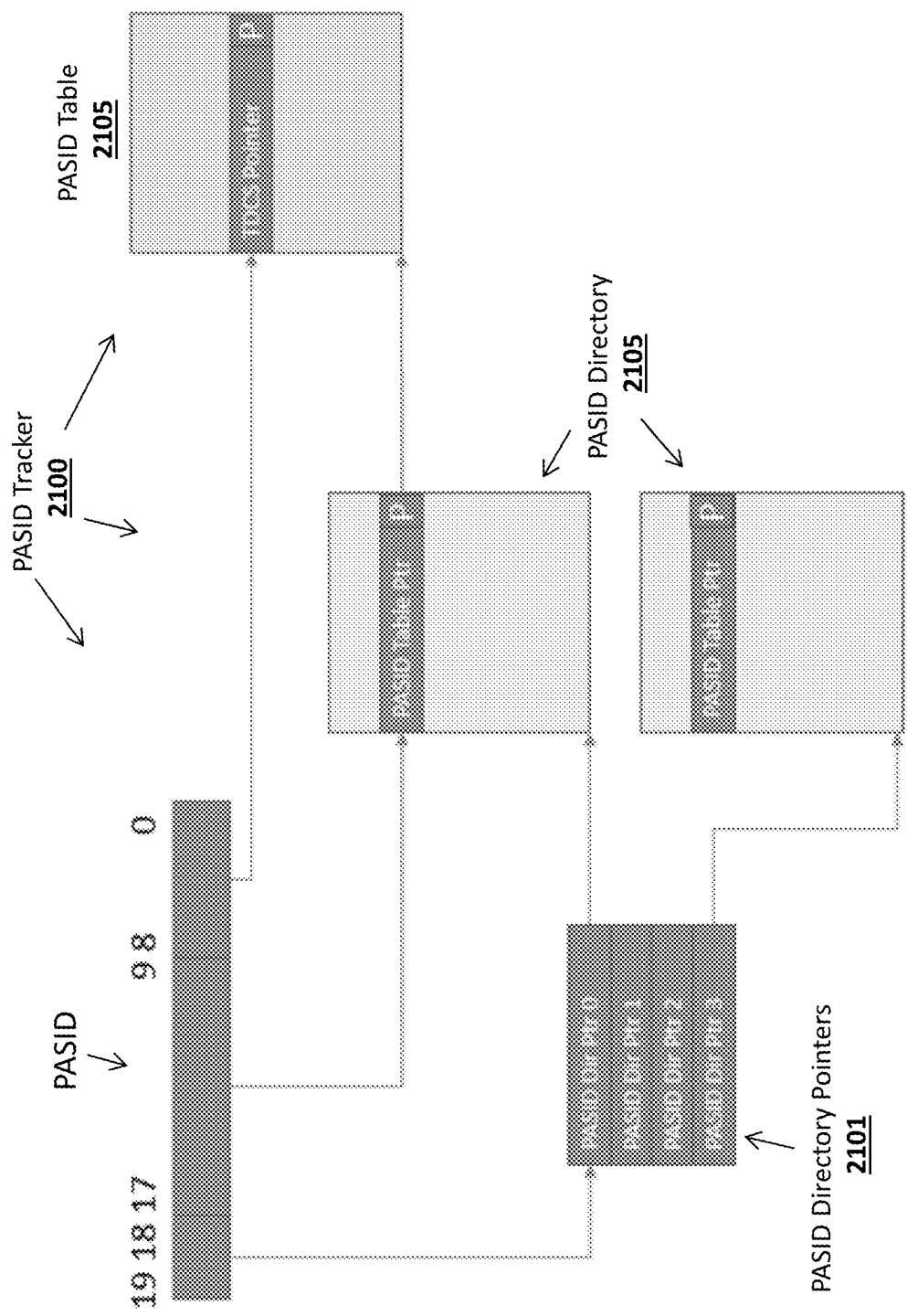
FIG. 21 illustrates an example of a PASID tracker.

In one embodiment, the PASID table includes two structures which remain reserved in the VMM established data structures. As illustrated in FIG. 20, which illustrates an example PASID entry 2001, the TDCS pointer 2002 is the pointer to the TD control structure of the TD that has been assigned this PASID. The second structure, TD MK-TME KID 2003, is the multi-key TME key ID assigned to this TD and is used by the IOMMU to tag the translated physical address such that those DMA transactions can access memory encrypted by the TD private Key ID.

In one embodiment, the processing of assigning a device to a TD fills out the trusted data structures described above (e.g., trusted device context 1602, page tables 1603, microcode managed EPT 1604). In one embodiment, the following new instructions perform the TD device assignment:

TDPASIDASSIGN—this instruction allocates a PASID to a TD. The instruction verifies that the PASID has not been already assigned to any other TD and subsequently updates a PASID tracker structure to record the PASID assignment.

TDDEVICEBIND—this instruction is used by the TD to indicate it wishes to take ownership of a device and/or PASID. This instruction does not give the TD ownership immediately but is used by the TD to create a processor signed data structure (e.g., device-bind-structure), that it can then provide to the VMM to request assignment. Having the data structure signed by the processor enforces that the VMM cannot change the request; the VMM can only either accept the request or reject the request.

TDDEVICEASSIGN—this instruction is used by the VMM to execute the request of the TD to take ownership of the device. This instruction takes the signed data structure (e.g., device-bind-structure) created by the TDDEVICEBIND instruction as one of the parameters. This instruction then builds the trusted structures used by the IOMMU to perform access controls.

TDDEVICEUNBIND—this instruction is used by the TD it wishes to release ownership of a previously assigned device and/or PASID. Like TDDEVICEBIND this instruction generates a processor signed data structure (e.g., device-unbind-structure) that is then provided to the VMM to request the release.

TDDEVICEREMOVE—this instruction is used by the VMM to execute the request of the TD to release ownership of the device. This instruction takes the signed data structure (e.g., device-unbind-structure) created by the TDDEVICEUNBIND instruction as one of the parameters. This instruction then updates the trusted structures used by the IOMMU to perform access controls to remove this device and/or PASID related entries.

TDDEVCTXMEMORYRECLAIM—this instruction reclaims a memory structure linked to the data structure connected to the trusted root pointer.

TDPASIDTRKRMEMORYRECLAIM—This instruction is used to reclaim the VMM allocated memory for the PASID tracker if the structure is now free.

TDCONFIGIOMMU—this instruction is used by the VMM to program the root of the device context table into various IOMMUs in the platform.

Details for specific implementations of these instructions are provided below.

TDPASIDASSIGN

As mentioned, the TDPASIDASSIGN instruction updates a PASID tracker structure to assign a PASID to a TD. This PASID tracker structure is built out of memory provided by the VMM but encrypted by the instruction using the platform reserved key ID (PKID).

One embodiment of the TDPASIDASSIGN instruction includes the following input and output parameters:

Input Params:
PASID—PASID to assign
TDCS Ptr—Pointer to the TD control structure page
SPARE_PAGE_PA—Physical address of a spare page that may be used by this instruction to build the tracking structure Output Params:
Status—OK—assignment succeeded, FAIL—assignment failed
SPARE_PAGE_STATUS—whether the instruction consumed the provided spare page
ERROR_CODE—reason for assignment failure—one of
ALREADY_ASSIGNED—PASID is already assigned
NEED_MORE_MEMORY—more memory is needed to build the PASID tracker
UNSPECIFIED—other errors One embodiment of the TDPASIDASSIGN instruction builds the PASID tracker 2100 as a two level data structure as shown in FIG. 22. The PASID directory pointers 2101 point to a location within the PASID directory 21045 which includes entries identifying a PASID table comprising directory pointer 0 through directory pointer 3 are control registers in the processor and their reset default state is NULL.

The bits 19:18 of the PASID that is input to the instruction is used to check if the corresponding PASID directory pointer is NULL. If it is NULL then the spare page provided by the VMM is consumed and its address is recorded in the corresponding control register. The page is then initialized to all 0 using the PKID which also ensure that the VMM cannot tamper with this page anymore. In order to do this initialization, one embodiment of the instruction uses the MOVDIR64 uop which does a cache line wide store without doing a RFO on the corresponding cache line. The instruction then returns the error code NEED_MORE_MEMORY.

If the PASID directory pointer was not NULL, the instruction reads the PASID directory entry using the bits 18:10 of the input PASID. If the entry is not present, the spare page provided by the VMM is consumed and its address recorded in the corresponding PASID directory entry. The page is then initialized to all 0 using the PKID which also ensures that the VMM cannot tamper with this page anymore. As described above, the instruction may use the MOVDIR64 uop which does a cache line wide store without doing a RFO on the corresponding cache line. The instruction then returns the error code NEED_MORE_MEMORY.

If the PASID directory entry was not NULL, the instruction reads the PASID table entry using the bits 9:0 of the input PASID. If the entry is valid and the TDCS pointer recorded in the entry is not the TDCS pointer input to the instruction then the instruction returns error ALREADY_ASSIGNED. If the entry is not valid then the instruction marks the entry as valid and records the TDCS pointer in the entry to successfully complete the assignment. On successful assignment the instruction returns the status as OK.

TDDEVICEBIND

This instruction is used by the TD to indicate it wants to take ownership of a device and/or PASID.

Input Parameters:
Requester ID—bus/device/function number of the device to own
PASID—the host PASID to own
Device-Exclusive—flag to indicate if the TD wants to take ownership of the entire device function or just a PASID context in that device function
Default PASID—the PASID to use for device transactions that do not carry PASID. This field is valid only if Device-Exclusive is set to 1.
Device-TLB-Enable—whether to allow device side IOTLBs—this is used by the IOMMU to allow or deny address translation service (ATS) requests from the device
First Level Paging Mode—if the TD is enabling two level i.e. nested page tables for DMA transactions then it specifies the format of the first level page table
First Level Page Table Pointer—the guest physical address of the first level page table if enabling nested translations
Write-protect-enable—whether allow supervisory DMA requests to ignore write permissions in first level page table
Supervisor-request-enable—whether to allow supervisory DMA requests Output Parameters:

Status—OK—bind succeeded, FAIL—bind failed

Device-bind-structure—this structure includes the input parameters and additionally has a MAC which is generated on the input parameters by the processor using a processor internal key. The MAC also covers a anti-replay counter that is used to ensure that this device-bind-structure is used only once. The sub-fields of this structure are: Input Parameters, Anti-replay Counter, and MAC over the input parameters and anti-replay counter.

One embodiment of the instruction writes the input parameters to the device-bind-structure. The instruction also atomically increments a bind-unbind-allocation-counter in the TD control structure and writes the pre-incremented value to the device-bind-structure as the anti-replay-counter. The instruction then generates a MAC on the input parameters and bind-unbind-allocation-counter counter and using a processor internal key and writes it to the device-bind-structure.

The TD control structure holds two counters—a bind-unbind-allocation-counter and a bind-unbind-consumed-counter. The allocation counter is what is filled into the structure as the anti-replay counter and incremented by this instruction. The consumed counter is incremented by the TDDEVICEASSIGN/TDDEVICEREMOVE instructions. Thus the anti-replay check done by the TDDEVICEASSIGN/TDDEVICEREMOVE is that the counter in the device-bind-structure should be equal to the bind-unbind-consumed-counter.

TDDEVICEASSIGN:

This instruction is used by the VMM to request the processor to assign the device to the TD. This involves building out the trusted root, context, PASID directory and PASID table structures. In order to build these structures the VMM provides memory as parameter that may be consumed by this instruction.

Input Parameters:

Device-bind-structure—signed structure created by the TDDEVICEBIND instruction

Max PASID

SPARE_MEMORY_PTR1

SPARE_MEMORY_PTR2

Reject

The largest contiguous structure that needs to be allocated as part of the build of the IOMMU data structures is the PASID directory. This PASID directory needs 4K bytes for every 32768 PASIDs. Thus the Max PASID parameter is used to determine the size of the spare memory provided as parameter to this instruction. The size of the memory is thus Floor(Max_PASID/32768)+1 pages. This is provided in the SPARE_MEMORYPTR2.

All other structures are 4K size and the SPARE_MEMORY_PTR1 is a 4K sized structure provided by the VMM.

The reject is a special flag that is input to this instruction that indicates a request from the VMM to complete this instruction with an error but to advance the anti-rollback counter such that a subsequent request could be processed. This flag is used by the VMM when it does not approve of the device-bind-structure contents as provided by the TD.

Output Parameters:

Status—OK—bind succeeded, FAIL—bind failed

ERROR_CODE

REJECT_REQUESTED—the instruction was requested to fail due to reject flag

NEED_MORE_MEMORY_SPARE_MEMORY_PTR1_USED—The SPARE_MEMORY_PTR1 was consumed and the operation needs more memory to build out the structures NEED_MORE_MEMORY_SPARE_MEMORY_PTR2_USED—The SPARE_MEMORY_PTR2 was consumed and the operation needs more memory to build out the structures UNSPECIFIED—other errors Operation:

The instruction first verifies the MAC on the device bind structure using the CPU internal key and if not valid generates an error. Then the instruction does anti-replay check as described before and if failed returns error.

If the reject requested flag was set to TRUE then the instruction advances the anti-replay counter by incrementing the bin-unbind-consumed-counter and returning a failure response with error code as REJECT_REQUESTED.

The instruction first verifies that the PASID recorded in the device-bind-structure is assigned to the TD recorded in the device-bind-structure. To do this verification the instruction looks up the PASID tracker to verify that the PASID is assigned to this TD. If the PASID tracker pointer is NULL or if the PASID is not assigned to the TD, the instruction returns an error.

The trusted root pointer of this data structure is a control register in the CPU whose reset value is NULL.

If trusted root pointer is NULL then the 4K page provided by SPARE_MEMORY_PTR1 is consumed by the instruction. The instruction programs the CPU trusted root pointer with address of this structure and the CPU initializes this page to all 0 encrypted with PKID using the MOVDIR64 uop. The instruction then returns with error code NEED_MORE_MEMORY_SPARE_PTR1.

If the trusted root pointer not NULL, the processor indexes into the root table using the bus number of the requester ID in the device-bind-structure. If the root table entry is not valid then instruction consumes the SPARE_MEMORY_PTR1 and creates the root table entry. This page is now the context table structure for this device. The instruction then initializes the context table structure and returns with error code NEED_MORE_MEMORY_SPARE_PTR1.

If the root table entry is valid, the instruction walks forward context structure and reads the context table entry using the device+function number in the device-bind-structure requester ID as index. If the context table entry is not valid then instruction consumes the SPARE_MEMORY_PTR2 and creates the context table entry. This page is now the PASID directory structure for this device. The instruction then initializes the context table structure and returns with error code NEED_MORE_MEMORY_SPARE_PTR2.

If the context table entry is valid, the instruction walks forward to PASID directory structure and reads the PASID directory entry using the PASID number in the device-bind-structure requester ID as index. If the PASID directory entry is not valid then instruction consumes the SPARE_MEMORY_PTR1 and creates the PASID directory entry. This page is now the PASID table structure. The instruction then initializes the PASID table structure.

Now that the instruction has verified that all structures at all levels are valid, the instruction starts the walk again from the root table entry and this time around fills out the context table entry and PASID table entry appropriately. The instruction then returns a success. This ensures that the entire table update was done atomically.

Finally the instruction increments the bind-unbind-consumed-counter used by the anti-replay checks.

Figure 22B:
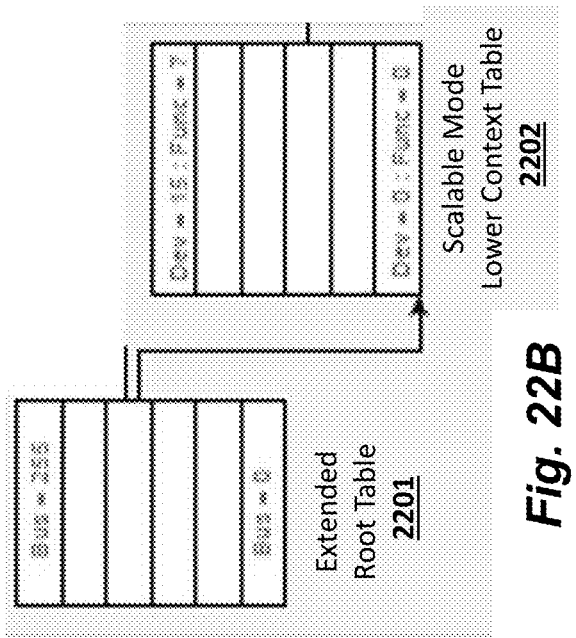
FIGS. 22A-E illustrate a sequence of lookups performed in one embodiment.
Figure 22A:
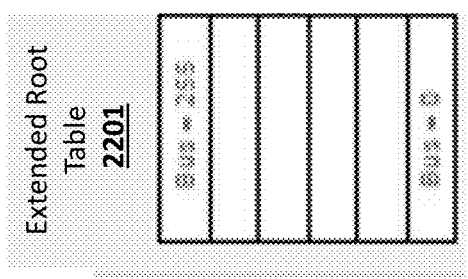

This build process is illustrated in FIGS. 22A-E for the case where the entire tree data structure was empty (e.g., the trusted root pointer was NULL). Referring to FIG. 22A, after the first invocation of the TDDEVICEASSIGN, the root table 2201 is allocated. The instruction returns with an error saying it needs more memory.

Referring to FIG. 22B, on the second invocation of TDDEVICEASSIGN, the context tables 2202 are allocated (e.g., the scalable mode lower context table 2202). The instruction returns with an error indicating it needs more memory.

Figure 22C:
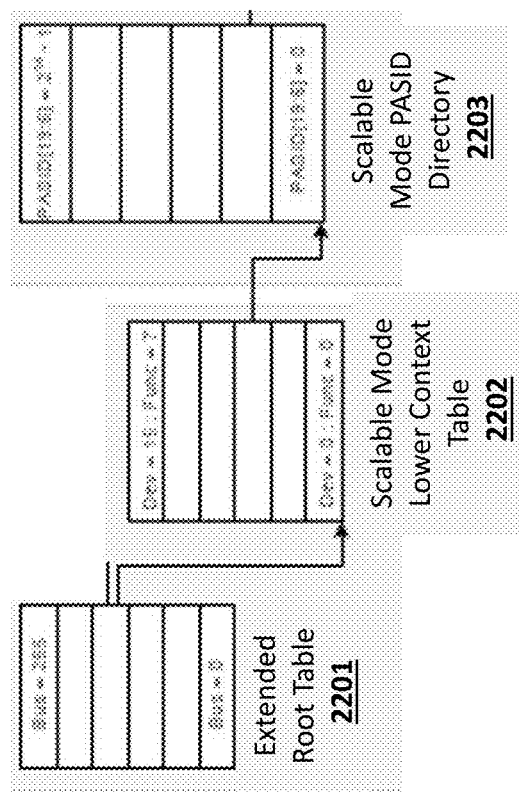

Referring to FIG. 22C, on the third invocation of TDDEVICEASSIGN, the scalable mode PASID directory 2203 is allocated. The instruction returns with an error indicating it needs more memory.

Figure 22D:
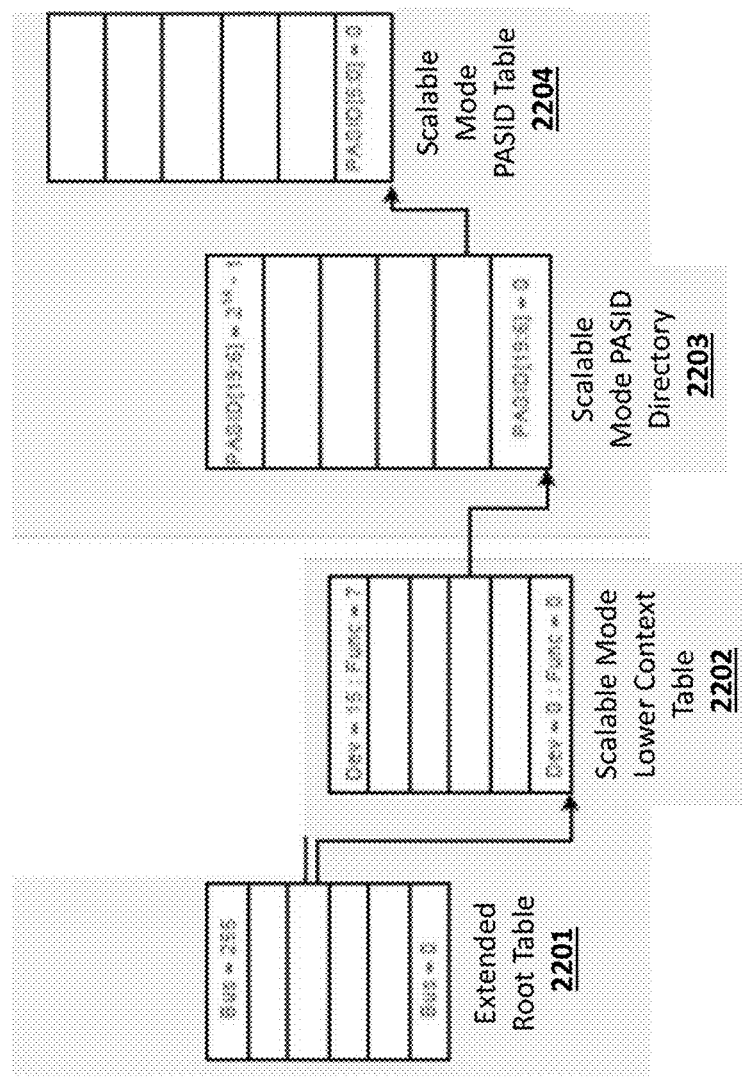
Figure 22E:
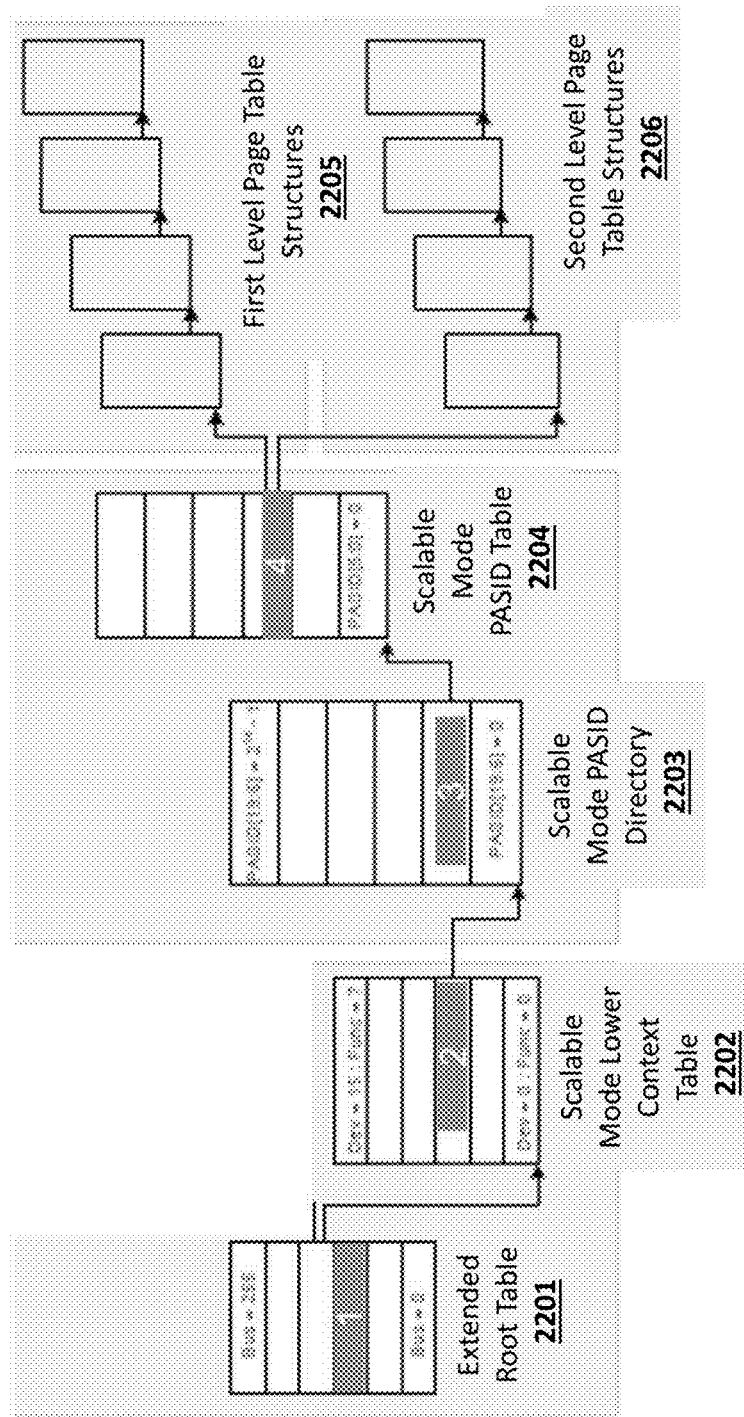

Referring to FIG. 22D, on the fourth invocation of TDDEVICEASSIGN, the scalable mode PASID table 2204 is allocated. Now that all the memory allocation is done, the instruction fills in the various table entries for this assignment as illustrated in FIG. 22E. These structures are then used to locate entries via the first level page table structures 2205 and the second level page table structures 2206.

The second level page table pointer (i.e., to second level page table structures 2206) is what was created as the EPT for the TD (see above secure EPT description for details). The first level page table pointer (i.e., to first level page table structures 2205) is as specified in the device-bind-structure described above. The context and PASID table entries that are not specified by the device-bind-structure are filled with safe defaults by the TDDEVICEASSIGN instruction.

TDDEVICEUNBIND

This instruction is similar to the TDDEVICEBIND instruction but encodes the TD wish to release a device. Like the TDDEVICEBIND instruction this instruction creates a device-unbind-structure which has a MAC and anti-replay counter like the device-bind-structure. A parameter in the device-unbind-structure indicates whether to release the PASID assignment. When the TD is not using the PASID for any other device context it can mark the PASID as released as well. This instruction also samples the bind-unbind-allocation-counter as the anti-replay counter to include in the device-unbind-structure and atomically increments it.

In a different embodiment, the TDDEVICEBIND and TDDEVICEUNBIND may be implemented using a single instruction with an input flag to indicate which operation to perform.

TDDEVICEREMOVE

This instruction uses the device-unbind-structure as input parameter and releases the assignment of device and/or PASID done to the TD.

Input Parameters:
Device-unbind-structure—signed structure created by the TDDEVICEUNBIND instruction
Reject—a flag indicating the VMM would like the instruction to be rejected with a failure response but the anti-replay counter to be advanced
Output Parameters:
Status—OK—bind succeeded, FAIL—bind failed
ERROR_CODE
REJECT_REQUESTED—the instruction was requested to fail due to reject flag
UNSPECIFIED—other errors
Operation:

The instruction first checks if the TD ID recorded in the device-unbind-structure if a TD that has been terminated. If the TD has been terminated then the instruction will not verify the MAC on the device-unbind-structure since this is a cleanup operation following termination of the TD.

If the TD is not marked as terminated, the instruction first verifies the MAC on the device bind structure using the CPU internal key and if not valid generates an error. Then the instruction does anti-replay check as described before and if failed returns error.

If the reject requested flag was set to TRUE then the instruction advances the anti-replay counter by incrementing the bind-unbind-consumed-counter and returning a failure response with error code as REJECT_REQUESTED.

The instruction then uses the requester ID and PASID recorded in the device-unbind-structure to walk the data structures linked to the trusted root pointer. If any invalid table entries are encountered the instruction fails and returns error. If the PASID table entry was not associated with the TD from which this device is being removed then instruction fails and returns error.

If no failures were encountered the instruction then rewalks the structure and as it rewalks the structure it marks the PASID table entry as invalid and the context structure entry as invalid.

If the device-unbind-structure marked the PASID as released then the instruction walks the PASID tracker table and marks the PASID tracker entry as invalid and clears the TD ID recorded for that PASID.

The instruction the invalidates the IOMMU TLB and intemdiate context and paging structure caches in each IOMMU in which the trusted root table was programmed through the TRUSTED_INVALIDATION_REGISTERS in the TRUSTED_IOMMU_BAR.

Finally the instruction atomically increments the bind-unbind-consumed-counter.

TDDEVCTXMEMORYRECLAIM

This instruction is used to reclaim the VMM allocated memory if the structure is now free i.e. all device allocations using that structure have been removed.

Input Parameters:
Requester ID
PASID
VMM Key ID
Output Parameters:
FREE_PTR
FREE_SIZE
Status—OK, FAIL
Operation:

One embodiment of the instruction first walks using the requester ID and PASID to the last level it can reach. Once it reaches the last level it scans through all entries in that structure to see if they are valid. If any of the entries are valid then the instruction returns and error. If all entries are free then it unlinks that structure from its parent level. The instruction then initializes the structure to 0 using the VMM key ID, specified by the instruction parameter, using the MOVDIR64 uop. The instruction then returns success and provides the pointer to this structure in the FREE_PTR. The size of the structure freed is provided in the FREE_SIZE output parameter.

TDPASIDTRKRMEMORYRECLAIM

This instruction is used to reclaim the VMM allocated memory for PASID tracker if the structure is now free.

Input Parameters:
PASID
VMM Key ID
Output Parameters:
FREE_PTR
Status—OK, FAIL
Operation:

One embodiment of the instruction first walks using the PASID to the last level it can reach in the PASID tracker. Once it reaches the last level it scans through all entries in that structure to see if they are valid. If any of the entries are valid then the instruction returns and error. If all entries are free then it unlinks that structure from its parent level. The instruction then initializes the structure to 0 using the VMM key ID, specified by the instruction parameter, using the MOVDIR64 uop. The instruction then returns success and provides the pointer to this structure in the FREE_PTR.

TDCONFIGIOMMU

This instruction is used to configure the IOMMU in the platform with the root pointer of the CPU managed device context structures. The VMM invokes this with the address of the TRUSTED_IOMMU_BAR of each IOMMU in the platform.

The CPU also records the TRUSTED_IOMMU_BAR of all IOMMU in which the TRUSTED_ROOT_PTR was programmed into microcode private memory. This data is used subsequently to perform IOTLB invalidations when the device context is removed.

Input Parameters:
TRUSTED_IOMMU_BAR—base address of MMIO range containing the TRUSTED_ROOT_PTR register
Output Parameters:
Status—OK, FAIL
Operation:
One embodiment of the instruction writes the TRUSTED_ROOT_PTR register in the TRUSTED_IOMMU_BAR using the microcode SAI.

One Embodiment of IOMMU Operation:

When the IOMMU receives a DMA transaction from an authenticated device, it verifies the packet per link encryption session setup and then it checks the "trusted" bit in the header. If the trusted bit is clear then process as done currently using the VMM established root pointer.

If the "trusted" bit is set then the IOMMU looks up its context, PASID and IOTLB caches using the requester ID, PASID and address in the transaction along with the trusted bit. If there is a hit in the IOTLB then the physical address and the TD KID recorded in the IOTLB are sent to the mesh to complete the DMA transaction.

If there is a miss, then the IOMMU starts the table walk. This walk is done using the platform reserved key ID-PKID through the Trusted Device Context structures. Once the PASID table entry has been walked to, the IOMMU has the pointer to the first level page table, second level page table and the TD Key ID. The first and second level page tables are walked using the TD Key ID. Once the final translation is determine the IOTLB is filled with the translated physical address along with the TD KID with "trusted" bit set. The physical address and the TD KID are then sent to the mesh to complete the DMA transaction.

Root Port Completion Generation:

For non-posted requests from devices, like memory read, when the data is received from memory the root port generates the completion to the device. If the completion was in response to a trusted request, the trusted bit in the header of the completion is set to indicate this is trusted completion.

Figure 23:
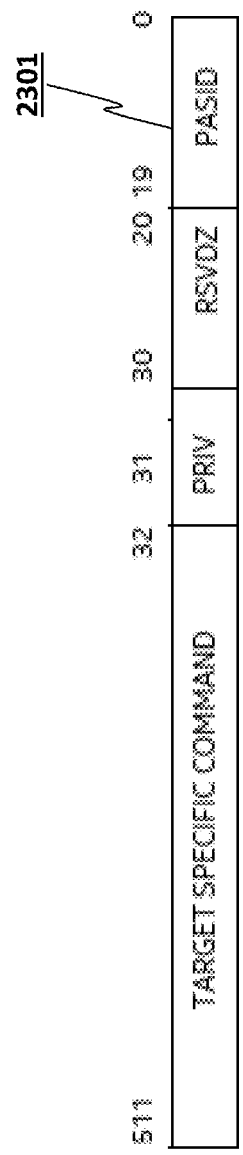
FIG. 23 illustrates an example of an enqueue instruction.

Enqueue Instructions—ENQCMDU/ENQCMDS:

The enqueue instructions ENQCMDUS and ENQCMDS enqueue a 64-byte command such as that shown in FIG. 23 using a non-posted write with 64-byte write atomicity to a device Shared Work Queue (SWQ) in the device. The payload of this command carries the PASID 2301 for which the work is being submitted.

When these instructions are invoked from the TD, the instruction will walk the PASID tracker structure that the PASID in the payload is assigned to. Thus enqueue instructions invoked from the TD guest require an identity mapping of PASID, i.e., no guest PASID to host PASID translation is performed. If there was an error in walking the PASID tracker structure or the PASID is not assigned to the TD then the instruction causes a # GP fault.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Components, features, and details described for any of the apparatus may also optionally apply to any of the methods, which in embodiments may be performed by and/or with such apparatus. Any of the processors described herein may be included in any of the systems disclosed herein. In some embodiments, the computer system may include an interconnect, a processor coupled with the interconnect, and a dynamic random access memory (DRAM) coupled with the interconnect. Alternatively, instead of DRAM, other types of volatile memory that don't need to be refreshed may be used, or flash memory may be used.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLES

The following are example implementations of different embodiments of the invention.

Example 1

An apparatus comprising: a decoder to decode a plurality of instructions including instructions related to a trusted domain; execution circuitry to execute a first one or more of the instructions to establish a first trusted domain using a first trusted domain key, the trusted domain key to be used to encrypt memory pages within the first trusted domain; and the execution circuitry to execute a second one or more of the instructions to associate a first process address space identifier (PASID) with the first trusted domain, the first PASID to uniquely identify a first execution context associated with the first trusted domain.

Example 2

The apparatus of example 1 further comprising: address translation circuitry to use the PASID to identify a first set of one or more translation tables to translate a guest virtual address to a guest physical address; and the address translation circuitry to use a first trusted domain identifier uniquely identifying the first trusted domain to identify a second set of one or more translation tables to translate the guest physical address to a host physical address within the first trusted domain.

Example 3

The apparatus of example 2 wherein the second set of page tables comprise a secure extended page table (SEPT).

Example 4

The apparatus of example 2 wherein the execution circuitry is to execute a third one or more of the instructions to assign the first trusted domain to one or more devices.

Example 5

The apparatus of example 4 wherein the one or more devices are identified by a requestor ID comprising a bus value, a device value, and a function value.

Example 6

The apparatus of example 5 wherein the first set of translation tables comprise a root table and a context table.

Example 7

The apparatus of example 6 wherein the address translation circuitry is to identify an entry in the root table using the bus value, the entry identifying a first context table.

Example 8

The apparatus of example 7 wherein the address translation circuitry is to identify an entry in the first context table using the device value and/or the function value, the entry to identify the PASID.

Example 9

The apparatus of example 8 wherein the address translation circuitry is to use a first portion of the PASID to identify an entry in a PASID directory and to use a second portion of the PASID combined with the entry in the PASID directory to identify a PASID table.

Example 10

The apparatus of example 9 wherein the address translation circuitry is to use an entry in the PASID table to identify the first set of one or more translation tables.

Example 11

A method comprising: establishing a first trusted domain using a first trusted domain key to encrypt memory pages within the first trusted domain; and associating a first process address space identifier (PASID) with the first trusted domain, the first PASID to uniquely identify a first execution context associated with the first trusted domain.

Example 12

The method of example 11 further comprising: identifying a first set of one or more translation tables using the PASID; translating a guest virtual address to a guest physical address using the first set of one or more translation tables; and identifying a second set of one or more translation tables to translate the guest physical address to a host physical address within the first trusted domain using a first trusted domain identifier which uniquely identifies the first trusted domain.

Example 13

The method of example 12 wherein the second set of page tables comprise a secure extended page table (SEPT).

Example 14

The method of example 12 wherein the execution circuitry is to execute a third one or more of the instructions to assign the first trusted domain to one or more devices.

Example 15

The method of example 14 wherein the one or more devices are identified by a requestor ID comprising a bus value, a device value, and a function value.

Example 16

The method of example 15 wherein the first set of translation tables comprise a root table and a context table.

Example 17

The method of example 16 wherein the address translation circuitry is to identify an entry in the root table using the bus value, the entry identifying a first context table.

Example 18

The method of example 17 wherein the address translation circuitry is to identify an entry in the first context table using the device value and/or the function value, the entry to identify the PASID.

Example 19

The method of example 18 wherein the address translation circuitry is to use a first portion of the PASID to identify an entry in a PASID directory and to use a second portion of the PASID combined with the entry in the PASID directory to identify a PASID table.

Example 20

The method of example 19 wherein the address translation circuitry is to use an entry in the PASID table to identify the first set of one or more translation tables.

Example 21

A machine-readable medium having program code stored thereon which, when executed by a machine causes the machine to perform the operations of: establishing a first trusted domain using a first trusted domain key to encrypt memory pages within the first trusted domain; and associating a first process address space identifier (PASID) with the first trusted domain, the first PASID to uniquely identify a first execution context associated with the first trusted domain.

Example 22

The machine-readable medium of example 21 further comprising program code to cause the machine to perform the operations of: identifying a first set of one or more translation tables using the PASID; translating a guest virtual address to a guest physical address using the first set of one or more translation tables; and identifying a second set of one or more translation tables to translate the guest physical address to a host physical address within the first trusted domain using a first trusted domain identifier which uniquely identifies the first trusted domain.

Example 23

The machine-readable medium of example 22 wherein the second set of page tables comprise a secure extended page table (SEPT).

Example 24

The machine-readable medium of example 22 wherein the execution circuitry is to execute a third one or more of the instructions to assign the first trusted domain to one or more devices.

Example 25

The machine-readable medium of example 24 wherein the one or more devices are identified by a requestor ID comprising a bus value, a device value, and a function value.

Example 26

The machine-readable medium of example 25 wherein the first set of translation tables comprise a root table and a context table.

Example 27

The machine-readable medium of example 26 wherein the address translation circuitry is to identify an entry in the root table using the bus value, the entry identifying a first context table.

Example 28

The machine-readable medium of example 27 wherein the address translation circuitry is to identify an entry in the first context table using the device value and/or the function value, the entry to identify the PASID.

Example 29

The machine-readable medium of example 28 wherein the address translation circuitry is to use a first portion of the PASID to identify an entry in a PASID directory and to use a second portion of the PASID combined with the entry in the PASID directory to identify a PASID table.

Example 30

The machine-readable medium of example 29 wherein the address translation circuitry is to use an entry in the PASID table to identify the first set of one or more translation tables.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   a decoder to decode a plurality of instructions including instructions related to a trusted domain;
   execution circuitry to execute a first one or more of the instructions to establish a first trusted domain using a trusted domain key, the trusted domain key to be used to encrypt memory pages within the first trusted domain,
   wherein the execution circuitry is to execute a second one or more of the instructions to associate a first process address space identifier (PASID) with the first trusted domain, the first PASID to uniquely identify a first execution context associated with the first trusted domain; and
   address translation circuitry to use the PASID to identify a first set of one or more translation tables to translate a guest virtual address to a guest physical address, and the address translation circuitry to further use a first trusted domain identifier uniquely identifying the first trusted domain to identify a second set of one or more translation tables to translate the guest physical address to a host physical address within the first trusted domain.

2. The apparatus of claim 1 wherein the second set of translation tables comprise a secure extended page table (SEPT).

3. The apparatus of claim 1 wherein the execution circuitry is to execute a third one or more of the instructions to assign the first trusted domain to one or more devices.

4. The apparatus of claim 3 wherein the one or more devices are identified by a requestor ID comprising a bus value, a device value, and a function value.

5. The apparatus of claim 4 wherein the first set of translation tables comprise a root table and a context table.

6. The apparatus of claim 5 wherein the address translation circuitry is to identify an entry in the root table using the bus value, the entry identifying a first context table.

7. The apparatus of claim 6 wherein the address translation circuitry is to identify an entry in the first context table using at least one of the device value and/or the function value, the entry to identify the PASID.

8. The apparatus of claim 7 wherein the address translation circuitry is to use a first portion of the PASID to identify an entry in a PASID directory and to use a second portion of the PASID combined with the entry in the PASID directory to identify a PASID table.

9. The apparatus of claim 8 wherein the address translation circuitry is to use an entry in the PASID table to identify the first set of one or more translation tables.

10. A method comprising:
    establishing a first trusted domain using a trusted domain key to encrypt memory pages within the first trusted domain;
    associating a first process address space identifier (PASID) with the first trusted domain, the first PASID to uniquely identify a first execution context associated with the first trusted domain;
    identifying a first set of one or more translation tables using the PASID;

translating a guest virtual address to a guest physical address using the first set of one or more translation tables; and identifying a second set of one or more translation tables to translate the guest physical address to a host physical address within the first trusted domain using a first trusted domain identifier which uniquely identifies the first trusted domain.

11. The method of claim 10 wherein the second set of translation tables comprise a secure extended page table (SEPT).

12. The method of claim 10 wherein the method further comprises executing a third one or more of the instructions to assign the first trusted domain to one or more devices.

13. The method of claim 12 wherein the one or more devices are identified by a requestor ID comprising a bus value, a device value, and a function value.

14. The method of claim 13 wherein the first set of translation tables comprise a root table and a context table.

15. The method of claim 14 wherein the method further comprises identifying an entry in the root table using the bus value, the entry identifying a first context table.

16. The method of claim 15 wherein the method further comprises identifying an entry in the first context table using at least one of the device value and the function value, the entry to identify the PASID.

17. The method of claim 16 wherein a first portion of the PASID is used to identify an entry in a PASID directory and a second portion of the PASID combined with the entry in the PASID directory is used to identify a PASID table.

18. The method of claim 17 wherein an entry in the PASID table is used to identify the first set of one or more translation tables.

19. A non-transitory machine-readable medium having program code stored thereon which, when executed by a machine causes the machine to perform the operations of:

establishing a first trusted domain using a trusted domain key to encrypt memory pages within the first trusted domain;

associating a first process address space identifier (PASID) with the first trusted domain, the first PASID to uniquely identify a first execution context associated with the first trusted domain;

identifying a first set of one or more translation tables using the PASID;

translating a guest virtual address to a guest physical address using the first set of one or more translation tables; and identifying a second set of one or more translation tables to translate the guest physical address to a host physical address within the first trusted domain using a first trusted domain identifier which uniquely identifies the first trusted domain.

20. The non-transitory machine-readable medium of claim 19 wherein the second set of translation tables comprise a secure extended page table (SEPT).

21. The non-transitory machine-readable medium of claim 19 wherein the operations further comprise executing a third one or more of the instructions to assign the first trusted domain to one or more devices.

22. The non-transitory machine-readable medium of claim 21 wherein the one or more devices are identified by a requestor ID comprising a bus value, a device value, and a function value.

23. The non-transitory machine-readable medium of claim 22 wherein the first set of translation tables comprise a root table and a context table.

24. The non-transitory machine-readable medium of claim 23 wherein the operations further comprise identifying an entry in the root table using the bus value, the entry identifying a first context table.

25. The non-transitory machine-readable medium of claim 24 wherein the operations further comprise identifying an entry in the first context table using at least one of the device value and the function value, the entry to identify the PASID.

26. The non-transitory machine-readable medium of claim 25 wherein a first portion of the PASID is used to identify an entry in a PASID directory and a second portion of the PASID combined with the entry in the PASID directory is used to identify a PASID table.

27. The non-transitory machine-readable medium of claim 26 wherein an entry in the PASID table is used to identify the first set of one or more translation tables.

* * * * *